United States Patent
Panidis et al.

(10) Patent No.: US 9,875,162 B1
(45) Date of Patent: Jan. 23, 2018

(54) RECOVERING CORRUPT STORAGE SYSTEMS

(71) Applicant: EMC Corporation, Hopkinton, MA (US)

(72) Inventors: Anestis Panidis, Saratoga, CA (US); Assaf Natanzon, Tel Aviv (IL); Saar Cohen, Moshav (IL)

(73) Assignee: EMC Corporation, Hopkinton, MA (US)

( * ) Notice: Subject to any disclaimer, the term of this patent is extended or adjusted under 35 U.S.C. 154(b) by 734 days.

(21) Appl. No.: 14/108,072

(22) Filed: Dec. 16, 2013

(51) Int. Cl.
*G06F 17/30* (2006.01)
*G06F 11/14* (2006.01)

(52) U.S. Cl.
CPC .... *G06F 11/1469* (2013.01); *G06F 17/30008* (2013.01); *G06F 17/30088* (2013.01); *G06F 17/30156* (2013.01)

(58) Field of Classification Search
CPC ......... G06F 17/30117; G06F 17/30073; G06F 17/30339; G06F 17/30371; G06F 17/30997; G06F 17/30082; G06F 17/30008; G06F 17/30088; G06F 17/30156
USPC .................................................. 707/639, 640
See application file for complete search history.

(56) References Cited

U.S. PATENT DOCUMENTS

| | | | |
|---|---|---|---|
| 5,765,201 A | 6/1998 | Manges et al. | |
| 7,007,114 B1 | 2/2006 | White | |
| 7,383,465 B1 | 6/2008 | van Rietschote | |
| 7,447,854 B1 | 11/2008 | Cannon | |
| 7,549,027 B1 | 6/2009 | McAndrews | |
| 7,587,431 B1 | 9/2009 | Rao | |
| 7,689,633 B1 | 3/2010 | Li et al. | |
| 7,797,582 B1 | 9/2010 | Stager | |
| 7,865,677 B1 | 1/2011 | Duprey | |
| 8,151,139 B1* | 4/2012 | Gordon | G06F 11/1469 714/15 |
| 8,271,441 B1 | 9/2012 | Natanzon | |
| 8,468,319 B1 | 6/2013 | Satran | |
| 8,532,383 B1 | 9/2013 | Thakkar et al. | |
| 8,566,542 B1 | 10/2013 | Wang | |
| 8,909,894 B1 | 12/2014 | Singh | |
| 8,983,952 B1 | 3/2015 | Zhang et al. | |
| 9,063,838 B1 | 6/2015 | Boyle | |
| 9,116,633 B2 | 8/2015 | Sancheti | |
| 2005/0273476 A1 | 12/2005 | Wertheimer | |
| 2007/0094467 A1 | 4/2007 | Yamasaki | |
| 2007/0100905 A1* | 5/2007 | Masters | G06F 21/568 |
| 2007/0185939 A1 | 8/2007 | Prahland et al. | |
| 2007/0186068 A1 | 8/2007 | Agrawal | |
| 2008/0184001 A1 | 7/2008 | Stager | |
| 2009/0182959 A1 | 7/2009 | Rao | |
| 2009/0319534 A1 | 12/2009 | Gokhale | |
| 2010/0185830 A1 | 7/2010 | Asnaashari et al. | |
| 2010/0198791 A1* | 8/2010 | Wu | G06F 11/1451 707/644 |

(Continued)

*Primary Examiner* — James Trujillo
*Assistant Examiner* — Fariborz Khoshnoodi
(74) *Attorney, Agent, or Firm* — Staniford Tomita LLP

(57) ABSTRACT

A method and system for recovering a corrupt storage system is discussed. A request to recover the system may be received. A backup snapshot for the last point-in-time the system was stable may be synthesized. A difference may be identified between that backup snapshot and the current system. The difference may be transmitted to the corrupt system to recover the data.

6 Claims, 18 Drawing Sheets

(56) References Cited

U.S. PATENT DOCUMENTS

| | | |
|---|---|---|
| 2010/0274985 A1 | 10/2010 | Yamagami |
| 2011/0161299 A1 | 6/2011 | Prahlad et al. |
| 2012/0136832 A1* | 5/2012 | Sadhwani ........... G06F 11/1469 707/640 |
| 2012/0203742 A1* | 8/2012 | Goodman ........... G06F 11/1469 707/646 |
| 2013/0060739 A1 | 3/2013 | Kalach et al. |
| 2013/0227352 A1 | 8/2013 | Kumarasamy et al. |
| 2014/0095816 A1 | 4/2014 | Hsu et al. |
| 2014/0337562 A1 | 11/2014 | Long |
| 2015/0019909 A1 | 1/2015 | Griffith |
| 2015/0039846 A1 | 2/2015 | Simon |

* cited by examiner

RECOVERING CORRUPT STORAGE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data backups, and more particularly to continuous data replication on deduplicated storage.

CROSS REFERENCE TO RELATED FILINGS

This application is related to co-pending U.S. patent application Ser. No. 14/108,021 for MAINTAINING BACKUP SNAPSHOT ON DEDUPLICATED STORAGE USING CONTINUOUS REPLICATION, U.S. patent application Ser. No. 14/108,032 for POINT-IN-TIME RECOVERY ON DEDUPLICATED STORAGE, U.S. patent application Ser. No. 14/108,053 for MAINTAINING POINT-IN-TIME GRANULARITY FOR BACKUP SNAPSHOTS, and U.S. patent application Ser. No. 14/108,060 for MAINTAINING BACKUP SNAPSHOTS USING CONTINUOUS REPLICATION FOR MULTIPLE SOURCES.

A description of journaling and some techniques associated with journaling may be described in the patent titled METHODS AND APPARATUS FOR OPTIMAL IOURNALING FOR CONTINUOUS DATA REPLICATION and with U.S. Pat. No. 7,516,287, and METHODS AND APPARATUS FOR OPTIMAL IOURNALING FOR CONTINUOUS DATA REPLICATION and with U.S. Pat. No. 8,332,687, which are hereby incorporated by reference.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include backup drives for storing organizational production site data on a periodic basis. Such systems suffer from several drawbacks. First, they may require a system shutdown during backup since the data being backed up cannot be used during the backup operation. Second, they limit the points in time to which the production site can recover. For example, if data is backed up on a daily basis, there may be several hours of lost data in the event of a disaster. Third, the data recovery process itself may take a long time.

Another conventional data protection system uses data replication, by creating a copy of the organization's production site data on a secondary backup storage system, and updating the backup with changes. The backup storage system may be situated in the same physical location as the production storage system, or in a physically remote location.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
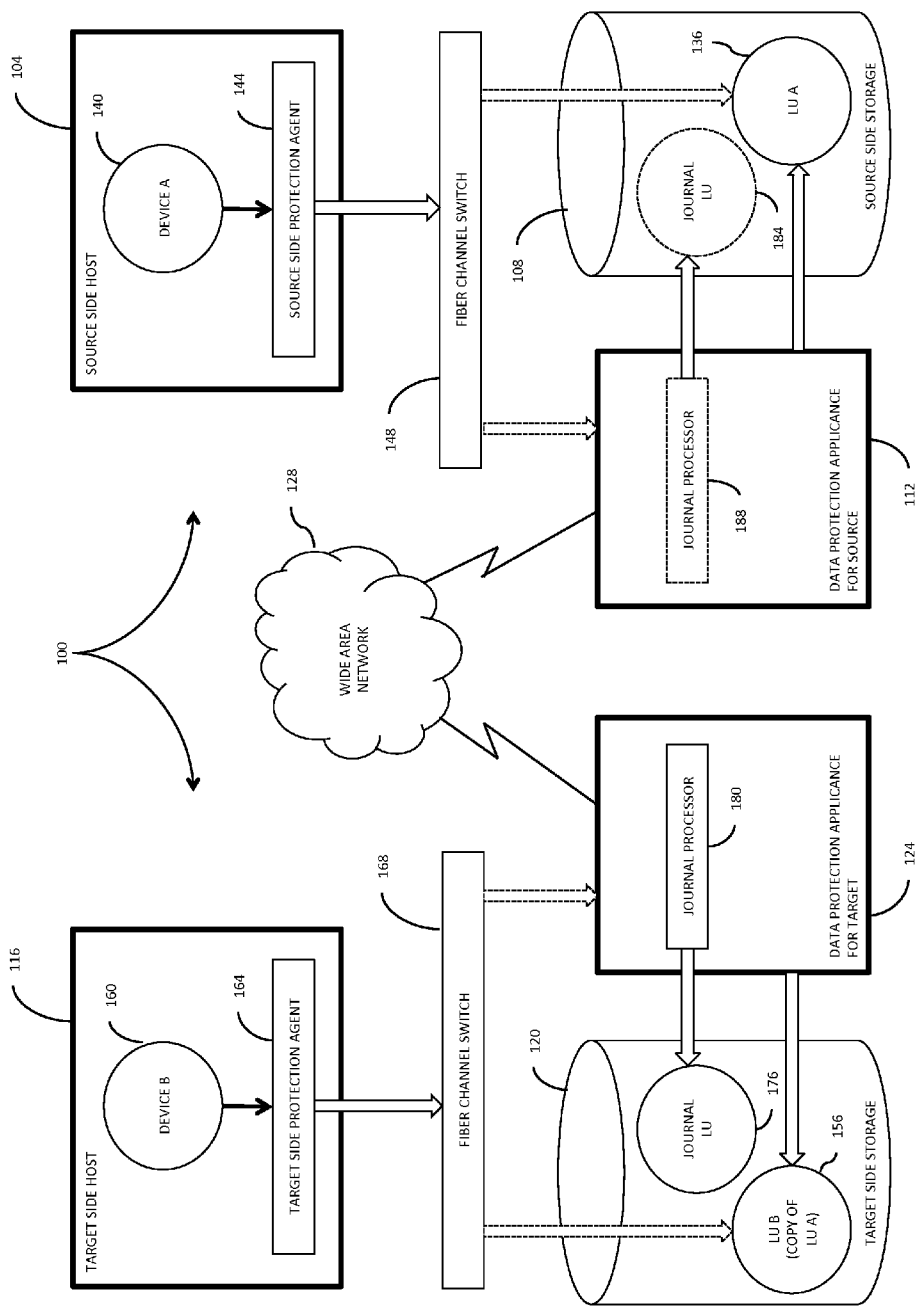
FIG. 1 is a simplified illustration of a data protection system, in accordance with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Systems, processes, and methods are discussed herein for enabling continuous data backups to deduplicated storage. In some embodiments, an initial backup snapshot of a source storage system may be created on the deduplicated storage using a data protection appliance. As changes are made to the source storage system, the IO's may be continuously communicated to the deduplicated storage for backup and protection.

In some embodiments, the deduplicated storage and/or data protection appliance may maintain journals, including data journals and metadata journals, for synthesizing new backup snapshots and/or recovering files. The journals may include DO and UNDO information compiled from IO's communicated from the data protection appliance to the deduplicated storage. These IO's may be applied to a backup snapshot to restore the snapshot to a previous point-in-time, or may be used to synthesize a new snapshot.

In an embodiment, data protection windows may be defined based on policy or user preference. The data protection windows may be used to maintain snapshots and/or journals for designated periods of time. For example, short-term windows may maintain both snapshots and journals for any point-in-time recovery (assuming the point-in-time falls within the short-term window). Mid-term windows, in contrast, may delete journals but maintain all the snapshots created during a period, and long-term windows may delete all the journals and select snapshots. Defining different protection windows may allow point-in-time recovery for files accessed recently, while also providing reduced storage consumption for long-term backups.

The systems discussed herein may additionally allow backup snapshots to be synthesized on deduplicated storage from IO's provided from multiple data protection appliance. For example, two data protection appliances may protect a single SAN. Each of those data protection agents may report IO's to the deduplicated storage, and a single backup snapshot may be synthesized from the journals maintaining those IO's The following non-limiting definitions may be helpful in understanding the specification and claims:

BACKUP SITE—may be a facility where replicated production site data is stored; the backup site may be located in a remote site or at the same location as the production site; a backup site may be a virtual or physical site.

CDP—Continuous Data Protection, may refer to a full replica of a volume or a set of volumes along with a journal which allows any point in time access, the CDP copy is at the same site, and maybe the same storage array of the production site.

DATA PROTECTION APPLIANCE ("DPA")—may be a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

HOST—may be at least one computer or networks of computers that runs at least one data processing application that issues I/O requests to one or more storage systems; a host is an initiator with a SAN; a host may be a virtual machine.

HOST DEVICE—may be an internal interface in a host to a logical storage unit.

IMAGE—may be a copy of a logical storage unit at a specific point-in-time.

INITIATOR—may be a node in a SAN that issues I/O requests.

IOURNAL—may be a record of write transactions issued to a storage system. A journal may be used to maintain a duplicate storage system, and to rollback the duplicate storage system to a previous point-in-time.

LOGICAL UNIT—may be a logical entity provided by a storage system for accessing data from the storage system.

LUN—may be a logical unit number for identifying a logical unit. May also refer to one or more virtual disks or virtual LUNs, which may correspond to one or more Virtual Machines. As used herein, LUN and LU may be used interchangeably to refer to a LU.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system; may be a virtual or physical site.

RPA—may be replication protection appliance, and is another name for DPA. An RPA may be a virtual DPA or a physical DPA.

SAN—may be a storage area network of nodes that send and receive I/O and other requests, each node in the network being an initiator or a target, or both an initiator and a target.

SOURCE SIDE—may be a transmitter of data within a data replication workflow. During normal operation a production site is the source side, and during data recovery a backup site is the source side. Source side may be a virtual or physical site.

SNAPSHOT—a snapshot may refer to an image or differential representations of an image, i.e. the snapshot may have pointers to the original volume, and may point to log volumes for changed locations. Snapshots may be combined into a snapshot array, which may represent different images over a time period.

SPLITTER/PROTECTION AGENT—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

STORAGE SYSTEM—may be a SAN entity that provides multiple logical units for access by multiple SAN initiators.

STREAMING—may mean transmitting data in real time, from a source to a destination, as the data is read or created.

SYNTHESIZE—may mean creating a new file using pointers from existing files, without actually copying the referenced data. For example, a new file representing a volume at a points-in-time may be created using pointers to a file representing a previous point-in-time, as well pointers to journal representing changes to the volume TARGET—may be a node in a SAN that replies to I/O requests.

TARGET SIDE—may be a receiver of data within a data replication workflow; during normal operation a back site is the target side, and during data recovery a production site is the target side; may be a virtual or physical site.

VIRTUAL VOLUME—may be a volume which is exposed to host by a virtualization layer, the virtual volume may be spanned across more than one site and or volumes.

VIRTUAL RPA (vRPA)/VIRTUAL DPA (vDPA)—may be an DPA running in a VM.

WAN—may be a wide area network that connects local networks and enables them to communicate with one another, such as the Internet.

Overview of a Backup System Using a Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system. Additionally or alternatively, the protection agent may be installed as part of the storage array IO stack. In some embodiments the DPA may be installed as a virtual appliance or as a set of processes inside the storage array.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
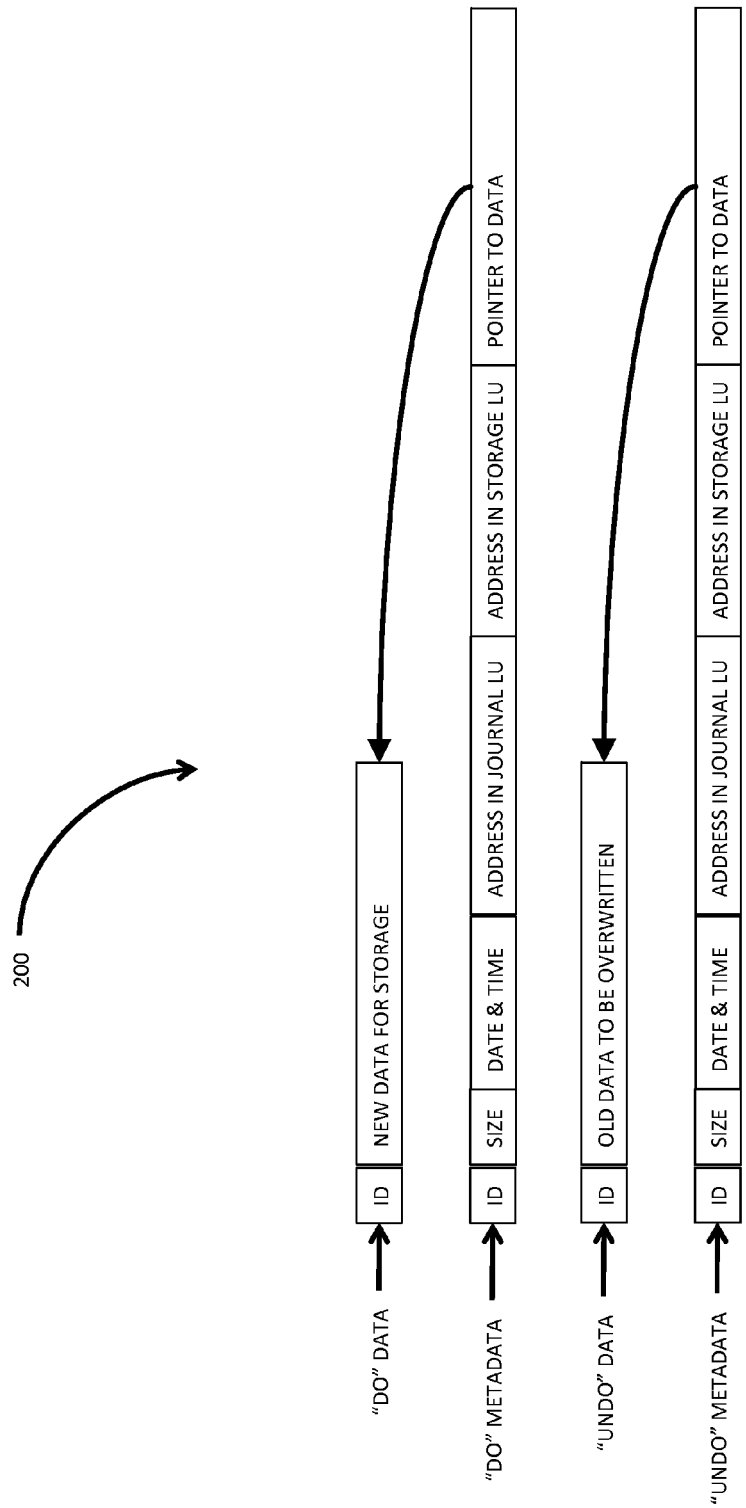
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Initializing a Backup Snapshot on Deduplicated Storage

Figure 3:
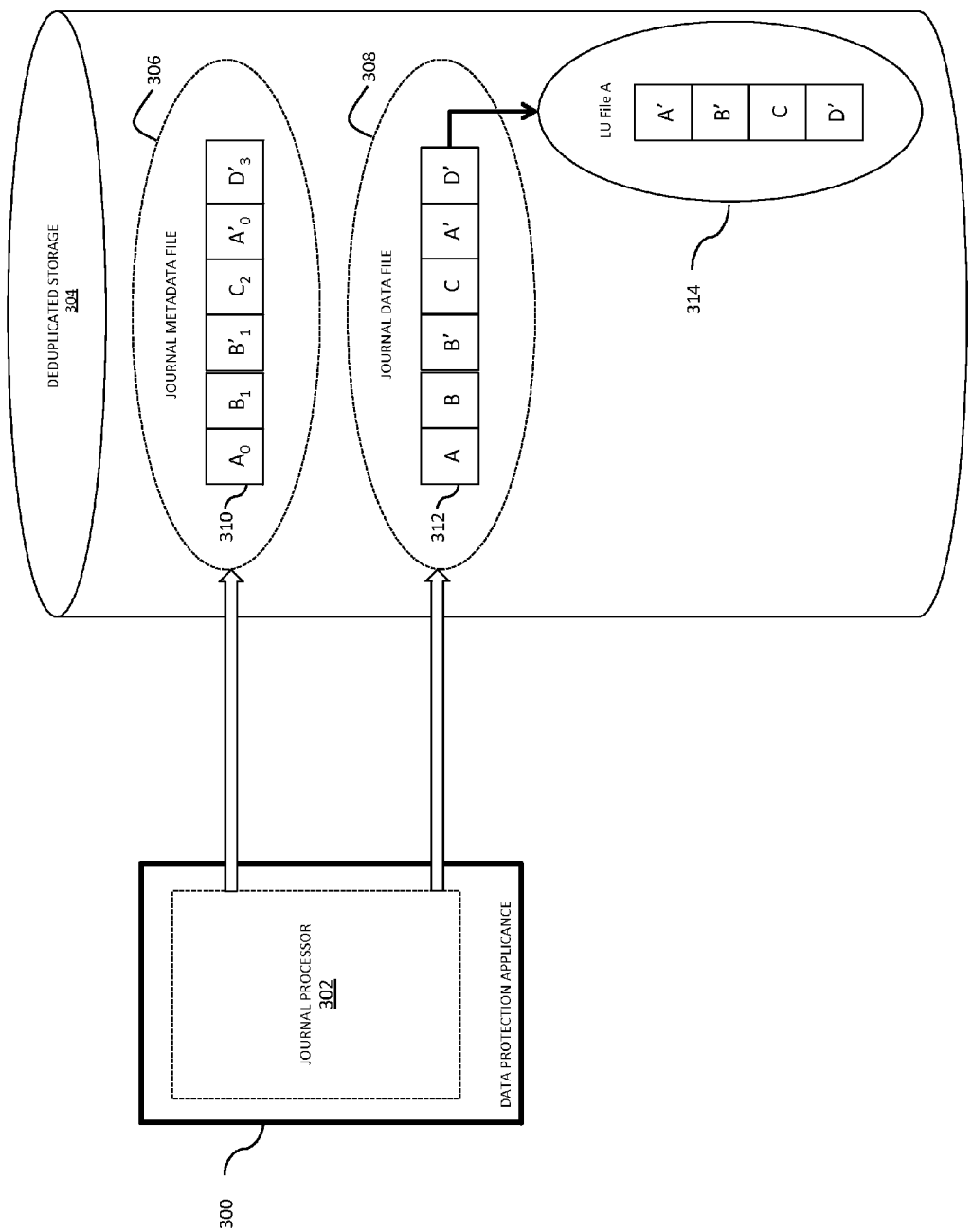
FIG. 3 is a system for initializing a backup snapshot, consistent with an embodiment of the present disclosure.
Figure 4:
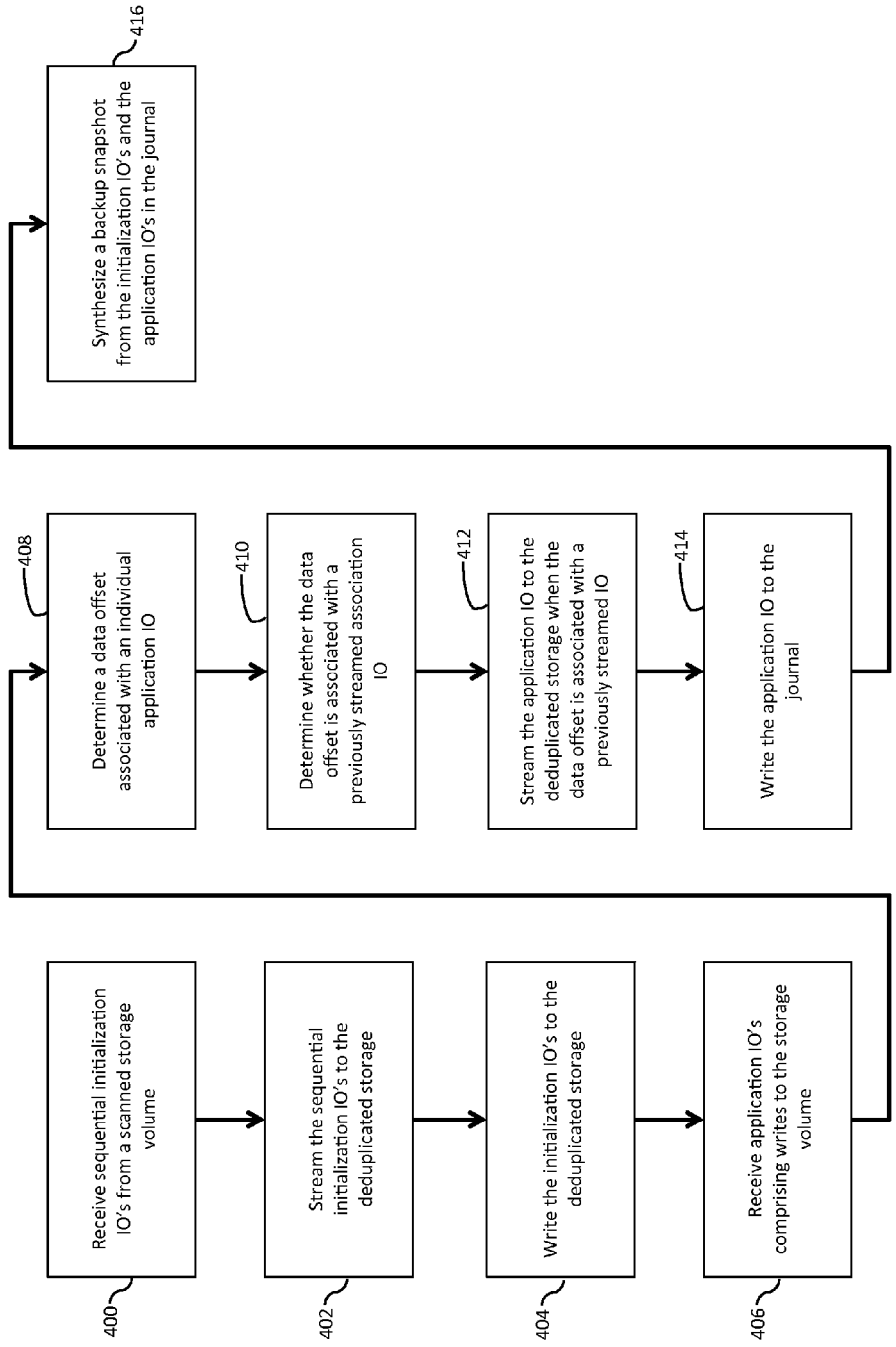
FIG. 4 is a flow chart for initializing a backup snapshot consistent with an embodiment of the present disclosure.
Figure 5:
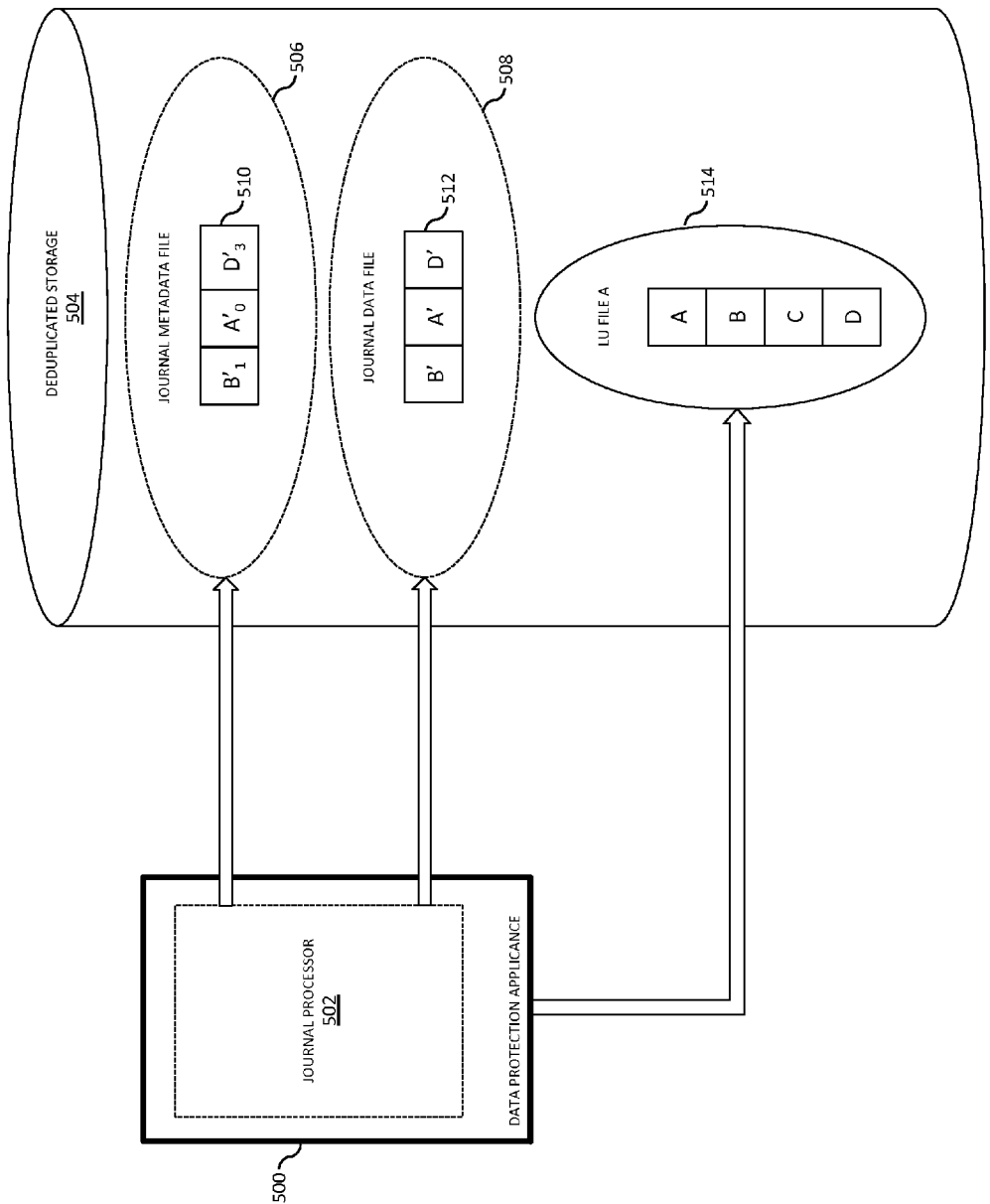
FIG. 5 is a system for initializing a backup snapshot, consistent with an embodiment of the present disclosure.

FIG. 3, FIG. 4, and FIG. 5 depict systems and processes for initializing a backup snapshot on deduplicated storage consistent with an embodiment of the present disclosure. Before deduplicated storage can provide continuous backup protection, it may be necessary to create an initial backup snapshot of the source storage system. This initial backup snapshot may represent the earliest point-in-time backup that may be restored. As changes are made to the source storage system, journal files and/or new backups may be updated and/or synthesized to provide continuous protection. In some embodiments, the initial backup snapshot may be created by streaming IO's from a storage system scan to a data protection appliance, or by taking an initial snapshot of the storage system and transmitting the entire snapshot to deduplicated storage.

FIG. 3 depicts a system for creating an initial backup snapshot by scanning a source storage system and streaming IO's to the deduplicated storage. Data protection application 300 may comprise journal processor 302, and may be in communication with deduplicated storage 304. In an embodiment, deduplicated storage 304 may be target side storage residing at a backup site. Data protection appliance 300 may be similar to data protection appliance 112 and/or 124, and may be responsible for streaming IO's to deduplicated storage 304.

In an embodiment, a source storage system may be scanned and individual offsets may be streamed to data protection appliance 300. The offsets streamed from the scanned system may be referred to as initialization IO's, and may be streamed sequentially to data protection appliance 300. For example, the scanned system may comprise offsets 0, 1, 2, and 3, comprising data A, B, C, and D. The initial scan may start at the beginning of the system, and transmit offset 0, followed by offset 1, et seq.

As data protection appliance 300 receives the initialization IO's, journal processor 302 may identify the offset data and metadata, and may stream the IO's to metadata journal 306 and/or data journal 308 residing on deduplicated storage 304. Data journal 308 may comprise data stored within an offset, and metadata 306 may include metadata associated with that offset. Metadata could include, for example, an offset identifier, size, write time, and device ID. These journals may then be used to synthesize a backup snapshot on deduplicated storage 304, as discussed below.

In some embodiments, a scanned storage system may operate in a live environment. As a result, applications may be writing to the storage concurrently with the scan process. If an application writes to a location that has already been streamed, the journal files and ultimately the synthesized snapshot may be out of date. To address this issue, application IO's may be streamed concurrently with the initialization IO's if the application IO's are to an offset that has already been scanned. For example, consider Table 1:

| Offset/Time | t0 | t1 | t2 | t3 |
|---|---|---|---|---|
| 0 | A | | | A' |
| 1 | B | B' | | |
| 2 | C | | | |
| 3 | D | | D' | |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application IO's to data protection appliance 300 if those IO's write to an offset that has already been scanned. If the offset has not been scanned, it may not be necessary to transmit the application IO's because the change will be transmitted when the scan reaches that offset.

Turning back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may contain the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

| | | |
|---|---|---|
| 0. | Vol A, offset = 0; size = 8 kb; time = t0 | |
| 1. | Vol A, offset = 8 kb; size = 8 kb; time = t0 | |
| 2. | Vol A, offset = 8 kb; size = 8 kb; time = t1 | |
| 3. | Vol A, offset = 16 kb; size = 8 kb; time = t0 | |
| 4. | Vol A, offset = 0; size = 8 kb; time = t3 | |
| 5. | Vol A, offset = 24 kb; size = 8 kb; time = t2 | |

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some embodiments, synthesizing the backup snapshot may comprise creating and/or copying pointers rather than copying entire data blocks. This could be, for example, using a product such as EMC® DataDomain® Boost™

For example, once the initial scan is complete, data journal 308 includes data A, B, B', C, A', and D'. A' and B' are the result of application IO's occurring during the scan process, and therefore represent the present state of offsets 0 and 1. To create backup snapshot 314, deduplicated storage may therefore retrieve A', B', C, and D' from the data journal 308 and synthesize them together.

Once initial backup snapshot 314 is synthesized, journal entries 310 and 312 may no longer be needed. In an embodiment, they may be removed from deduplicated storage 304 in order to conserve space. Alternatively, they may remain in the journals.

Turning now to FIG. 4, a process for creating an initial backup snapshot is discussed. At block 400, sequential initialization IO's are received from a scanned storage volume. These IO's could be, for example, received at a data protection appliance, such as data protection appliance 300. In some embodiments, the initialization IO's are read from the scanned storage volume by the data protection appliance.

At block 402, the initialization IO's are streamed to a deduplicated storage. In an embodiment, the deduplicated storage may be substantially similar to deduplicated storage 304. In some embodiments, the initialization IO's are streamed to a data journal using a data stream, and to a metadata journal using a metadata stream. Each stream may be a file in the deduplicated storage. Additionally or alternatively, writes to the journal files may be done though the DDBoost API or any other API.

At block 404, the initialization IO's may be written to a journal on the deduplicated storage. This journal may be, for example, similar to metadata journal 306 and/or data journal 308. In an embodiment, these journals may be in the same journal files. Alternatively, these may be separate files on the deduplicated storage system.

At block 406, application IO's comprising writes to offsets on the scanned storage volume may be received. These application IO's may also be received at a data protection appliance, such as data protection appliance 300.

At 408, an offset associated with a specific application IO is identified, and at 410 it is determined whether the offset has already been streamed to the deduplicated storage. This determination could be made on data protection appliance 300 using journal processor 302. If the offset has already been streamed, it must have already been scanned and included in an initialization IO. If the offset has not been streamed, the storage volume scan may not have reached the offset on the storage volume.

At block 412, the application IO is streamed to the deduplicated storage if its offset was included in a previously streamed initialization IO. In an embodiment, the application IO is only streamed when its offset was included a previously streamed initialization IO. Streaming the application IO when its offset was included in a previous initialization IO ensures that writes to the scanned volume are not missed during the initialization processes. In some embodiments, the application IO's are streamed to a data journal using a data stream, and to a metadata journal using a metadata stream.

In an embodiment, application IO's are not streamed if they comprise writes to an offset that has not yet been scanned and streamed in an initialization IO. This is because the data created by the write will be included in the initialization IO once the scan reaches that offset. This may reduce traffic between the data protection appliance and the deduplicated storage, and may reduce the workload on the deduplicated because the data will only be processed once.

At block 414, the application IO is written to the journal. This journal may be the same journal as the initialization IO's, or it may be a separate journal. In an embodiment, the journal is data journal 308 and/or metadata journal 306.

Finally, at 416, a backup snapshot is synthesized from the initialization IO's and the application IO's. This snapshot may be substantially similar to snapshot 314. In an embodiment, the snapshot is synthesized by creating data pointers in a new file on the deduplicated storage. Additionally or alternatively, the pointers may be copied from the data journal. These pointers may point to the data referenced and/or contained in the journal. Synthesizing the snapshot using pointers may improve performance, as the data may not need to be replicated.

FIG. 5 depicts an additional or alternative embodiment for initializing a backup snapshot. The system shown in FIG. 5 may include data protection appliance 500, journal processor 502, and deduplicated storage 504. These elements may be substantially similar to those discussed in reference to FIG. 3.

Data protection appliance 500 may take a snapshot of a storage system and transmit that snapshot to deduplicated storage 504 for storage as a file. In an embodiment, this is different than streaming initialization IO's and synthesizing a snapshot from journal files. Rather than creating the snapshot on the deduplicated storage, the backup snapshot is created using the data protection appliance and transmitted to deduplicated storage to be stored as backup snapshot 514.

In an embodiment, journal processor 502 may stream application IO's to deduplicated storage, and those application IO's may be stored in metadata journal 506 and data journal 508. Like the journals of FIG. 3, metadata journal 506 may include metadata journal entries 510, and data journal 508 may include data journal entries 512. These journals may be used to synthesize a second backup snapshot or enable point-in-time recovery, as discussed below.

The systems and processes discussed in reference to FIG. 3, FIG. 4, and FIG. 5 enable a system to create an initial backup snapshot. Once the initial snapshot is created, additional processes may enable continuous data protection and point-in-time recovery. These processes will now be discussed.

Maintaining Backup Snapshots with Continuous Data Replication

Figure 6:
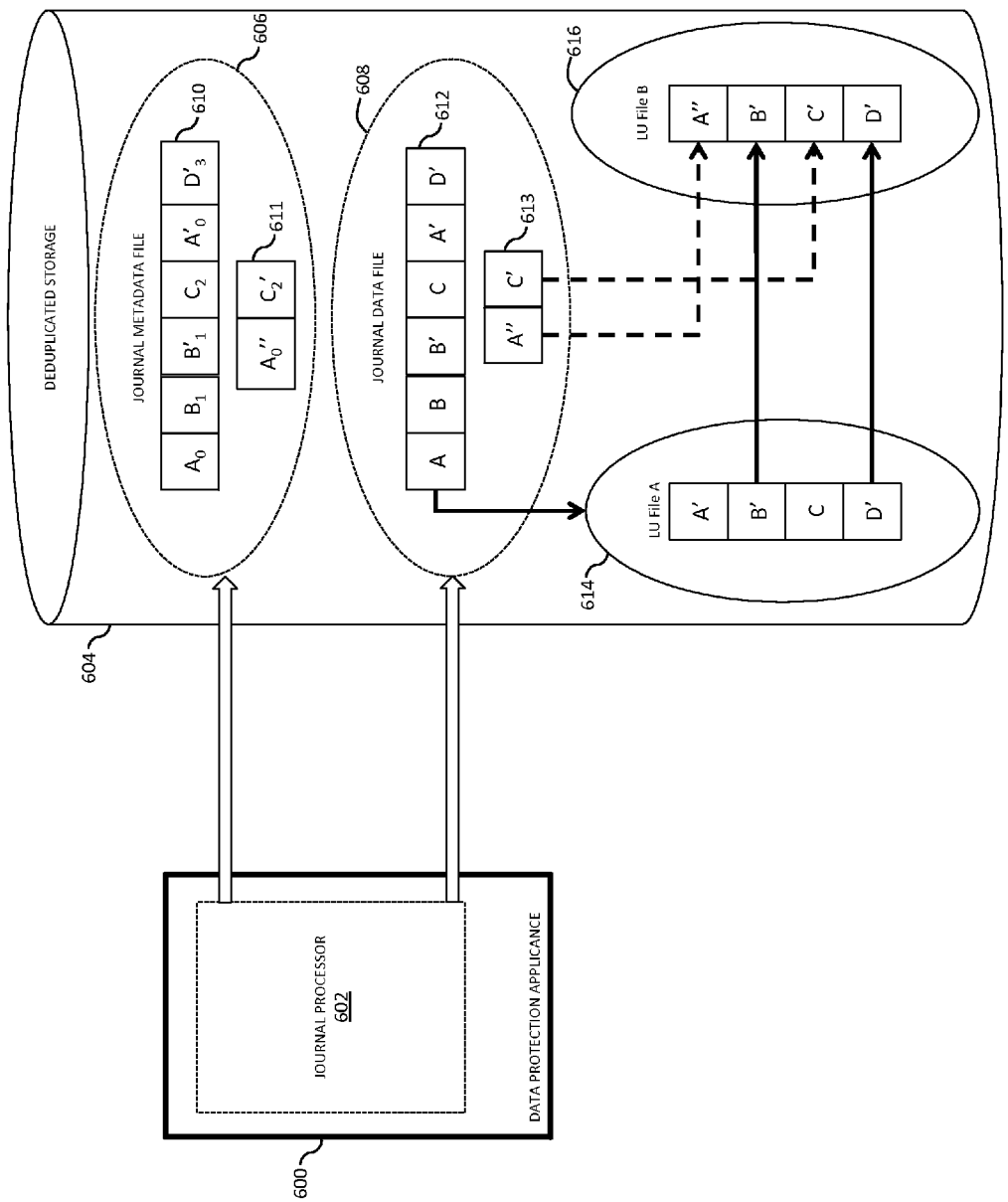
FIG. 6 is a system for synthesizing new backup snapshots, consistent with an embodiment of the present disclosure.

With reference now to FIG. 6, a system and process for maintaining backups using continuous data replication is discussed. As datasets increase in size, backing them up to remote or local backup devices becomes increasingly costly and complex. Additionally, traditional backup processes may not allow point-in-time recovery since the backups occur on a periodic, rather than continuous, basis. The methods and systems discussed herein provide continuous backup protection as writes are made to a source device, thereby reducing backup cost and complexity, and may allowing point-in-time recovery for backed up files.

The system of FIG. 6 includes data protection appliance 600, journal processor 602, and deduplicated storage 604. These elements may be substantially similar to those discussed in reference to FIG. 3. Deduplicated storage 604 may include backup snapshot 614, metadata journal file 606, and data journal file 608. In an embodiment, backup snapshot file 614 is synthesized in a manner substantially similar to backup snapshot 314, and may be created using metadata journal entries 610 and data journal entries 612.

As users, applications, and other processes access and use the source storage system, data on that system may change and/or new data may be created. As a result, initial backup snapshot 614 may become stale. If the source storage system should fail, there is a chance that any new or modified data may be lost. To address this concern, data protection appliance 600 may receive and stream application IO's to deduplicated storage system 604 on a continuous basis, even after initial backup snapshot 614 is synthesized. Streaming the application IO's allows the backups on deduplicated storage 604 to remain up-to-date, without needing to perform additional backups of large datasets. This may reduce network traffic, reduce workloads, and conserve space on deduplicated storage 604.

For example, new metadata entries 611 and new data journal entries 613 represent IO's made after initial backup snapshot 614 was synthesized. These entries may be written to metadata journal 606 and data journal 608, as shown in FIG. 6, or they may be written to separate journal files. In FIG. 6, data A' and C were modified on the source storage device, and the journal entries therefore comprise A" and C'.

Periodically, new backup snapshots may be synthesized from a previous backup snapshot and new journal entries. For example, second backup snapshot 616 may be synthesized from initial backup snapshot 614, new metadata journal entries 611, and new data journal entries 613. Second backup snapshot 616 may be used to restore source storage system up to the point-in-time the last journal entry was received. In other words, backup snapshot 616 represents a backup of the source storage system at a later timestamp than initial backup snapshot 614.

In an embodiment, synthesizing second backup journal entry 616 may be substantially similar to synthesizing the initial backup snapshot 614. Rather than synthesizing all of the data from data journal 608, however, unchanged data may be synthesized from initial backup snapshot 614. In an embodiment, this synthesis may comprise copying and/or creating a data pointer. For example, in FIG. 6 the solid arrows between initial backup snapshot 614 and second backup snapshot 616 represent unchanged data that is common between the two. In this case, only B' and D' remain unchanged. The dashed arrows represent new or changed data that needs to be synthesized into second backup snapshot 616. In FIG. 6, A' is changed to A", C is change to C'. Synthesizing the data into second backup snapshot 616 therefore results in A", B', C', D'.

Additionally or alternatively, second backup snapshot 616 may be synthesized entirely from journal entries. Rather than synthesizing unchanged data from initial backup 614, deduplicated storage 604 may retrieve the unchanged data from data journal entries 612. For example, B' and D' may be synthesized from data journal entries 612 rather than from initial backup snapshot 614.

Additional backup snapshots, such as second backup snapshot 616, may be created periodically or on demand. For example, a user policy may specify that new snapshots should be created every week. Additionally or alternatively, a user may be preparing to perform some risky operations on the source storage system, and may demand that a snapshot be created in case something goes wrong. These policies may be maintained and applied using data protection appliance 600, deduplicated storage 604, and/or an external system.

Figure 7:
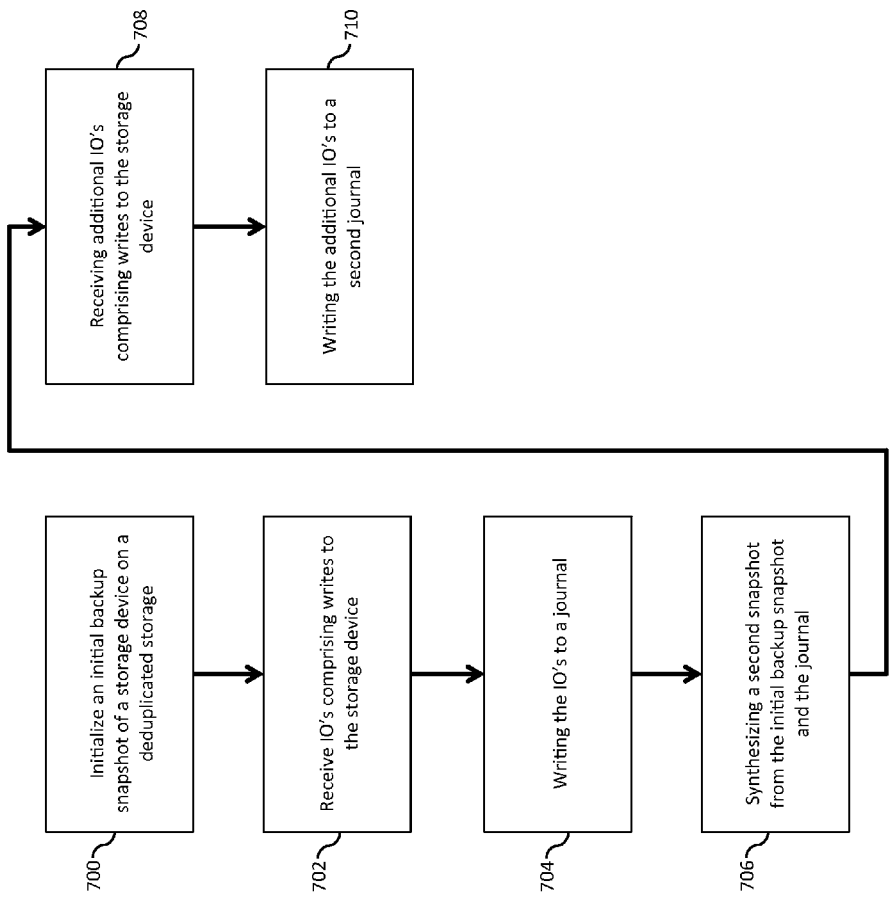
FIG. 7 is a flow chart for synthesizing new backup snapshots, consistent with an embodiment of the present disclosure.

Turning now to FIG. 7, a process for maintaining backup snapshots using continuous data replication is discussed. At block 700, an initial snapshot of a source storage system may be created. This initial snapshot may be substantially similar to initial backup snapshot 614, and may be created using the processes discussed in reference to FIG. 3, FIG. 4, and FIG. 5. Additionally or alternatively, the initial snapshot may be any previously created snapshot. For example, the initial snapshot may be similar to second backup snapshot 616, and may be used in conjunction with journal files to create a third backup snapshot.

At block 702, application IO's comprising writes to the source storage system may be received. These writes may update existing data or create new data. In an embodiment, the application IO's may be received by a data protection appliance, such as data protection appliance 600.

At 704, the application IO's may be written to a journal file. This journal file may be substantially similar to metadata journal file 606 and/or data journal file 608. In an embodiment, the application IO's may be written to one or more existing journals. Alternatively, application IO's arriving after a snapshot is synthesized may be written to their own unique journals. This may be beneficial, for example, when maintaining different levels of backup granularity, as discussed below.

In some embodiments, the application IO's are sequentially written to the journal as they are received. For example, if application IO's arrive in order B, C, A, their corresponding entries in the journal will also be B, C, A.

At block 706, a second snapshot may be synthesized from the initial backup snapshot and the journal. The second snapshot may be substantially similar to second backup snapshot 616, and the synthesis process may be similar to that depicted by the solid and dashed lines. In some embodiments, the second snapshot may be synthesized entirely from journal files rather than use the initial backup snapshot.

During and/or after the synthesis process, additional application IO's may be received at block 708. These application IO's could be used, for example, to create the third backup snapshot in the future, and may be processed in a manner similar to all the other application IO's discussed herein.

Finally, at block 710 the additional application IO's may be written to a journal file. They may be written to the same journal as the previous IO's, or they may be written to a new journal file.

Figure 7A:
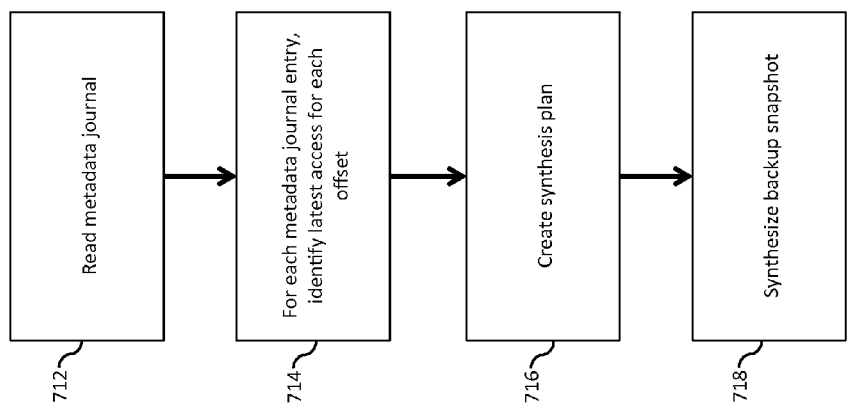
FIG. 7A is a flowchart for creating a synthesis plan consistent with an embodiment of the present disclosure.

FIG. 7A depicts a process for synthesizing snapshots used for continuous data replication. At block 712, a metadata journal may be read. This metadata journal could be, for example, metadata journal file 606. In an embodiment, the metadata journal may be read using a journal processor on a data protection appliance. Additionally or alternatively, the read operation may be local to the deduplicated storage device.

At block 714, the latest IO's for each offset may be identified. For example, metadata journal file 606 comprises journal entries 610 and 611. The latest entry for offset 0 is A", 1 is B', 2 is C', and 3 is D'. In some embodiments, journal entries 610 and 611 may be written to different journals. In such an embodiment, the only IO's identified would be A" and C' since we are synthesizing a snapshot from initial backup snapshot 614.

At 716, a synthesis plan may be created. This plan may identify where each IO should be synthesized from. For example, the synthesis plan may only identify A" and C' for synthesis from data journal 608. The B' and D', in contrast, may be obtained from initial backup snapshot 614 since they have not changed.

Finally, at block 718, the backup snapshot may be synthesized. This backup snapshot could be, for example, substantially similar to backup snapshot 616.

The system and processes discussed herein may enable additional backup snapshots to be synthesized from journal entries and existing snapshots. In some embodiments, the journal entries may be application IO's which are continuously streamed to a data protection appliance. While these snapshots may provide additional data protection, they may only allow data that exists in the snapshots to be recovered. Combining snapshots and journal files may, however, allow any point-in-time recovery.

Backup Point-in-Time Recovery from Deduplicated Storage

When datasets are backed-up on a periodic rather than continuous basis, data recovery may only be available for specific time intervals. For example, if a dataset is backed up at the end of every business day, the only data that is available for recovery is the data as it exists at the end of the day. Continuous backups, however, may allow recovery of data at any, or nearly any, point-in-time. By transmitting application IO's to a backup location as they occur, an interim snapshot may be synthesized between scheduled snapshots and data may be recovered.

Figure 8:
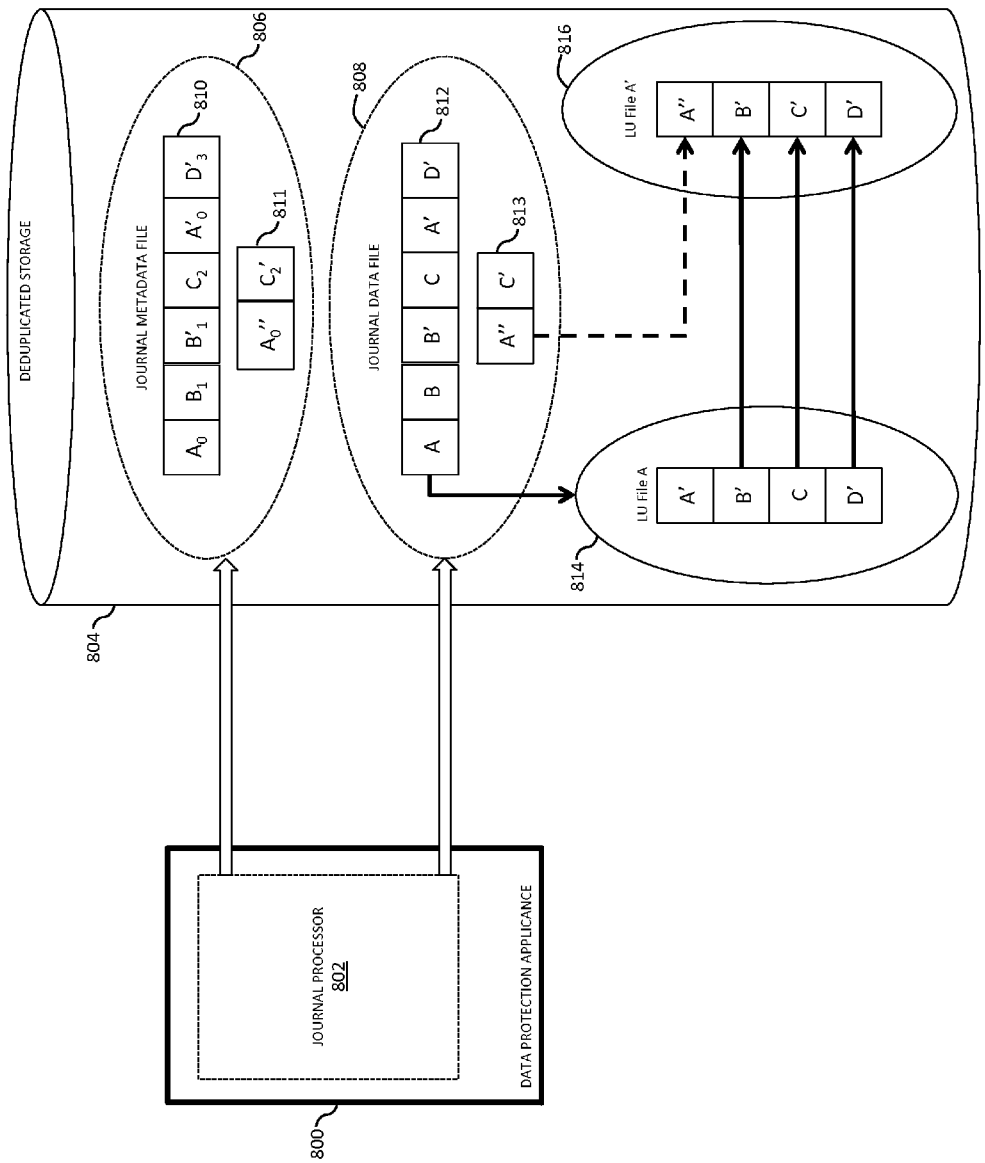
FIG. 8 is a system for point-in-time recovery, consistent with an embodiment of the present disclosure.
Figure 9:
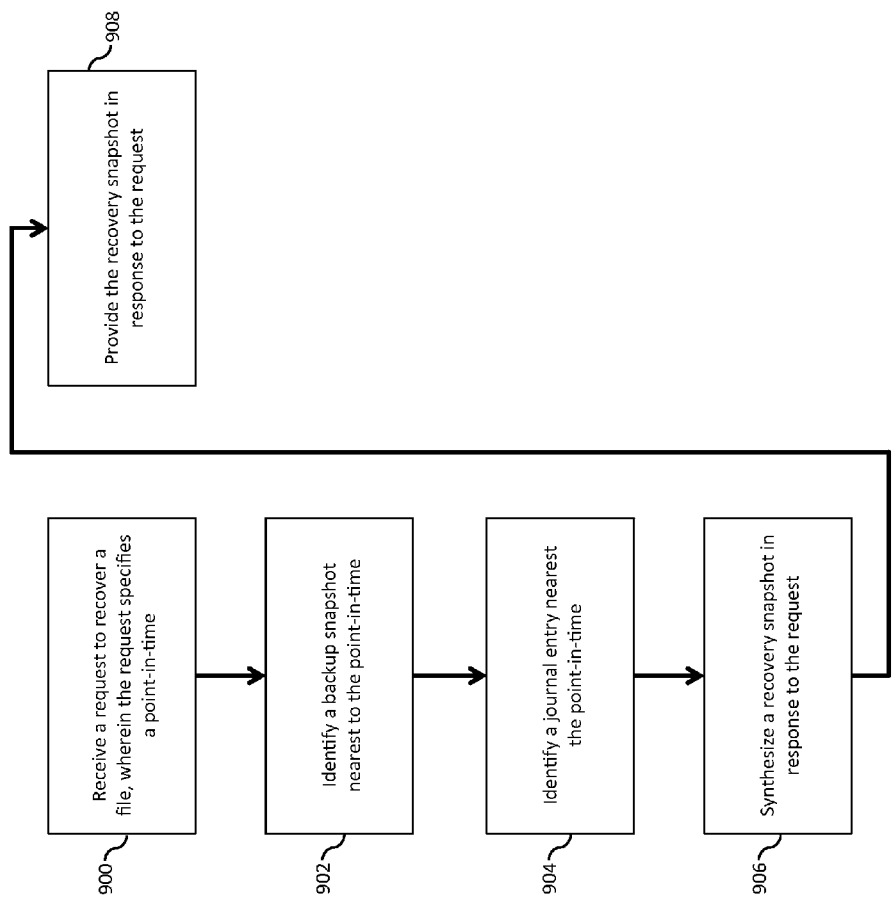
FIG. 9 is a flowchart for point-in-time recovery consistent with an embodiment of the present disclosure.

FIG. 8 and FIG. 9 depict a system and process for synthesizing an interim snapshot for point-in-time recovery. In an embodiment, the system may include data protection appliance 800, journal processor 802, and deduplicated storage 804. The system may also include metadata journal file 806, comprising metadata journal entries 810 and 811, and data journal file 808, comprising data journal entries 812 and 813.

Data protection appliance 800 may receive application IO's as they are made to a source storage system. In an embodiment, journal processor 802 may write those IO's to metadata journal file 806 and data journal file 808. Initialization journal entries 810 and 812 may be used to synthesize initial backup snapshot 814. Metadata entries 811 and data journal file entries 813 may be application IO's made to the source storage volume after or while initial backup snapshot 814 was synthesized. These elements may be substantially similar to those discussed in reference to FIG. 6.

In an embodiment, metadata journal entries 811 and data journal entries 813 may be used to synthesize interim snapshot 816. Interim snapshot 816 may then be used as a source for point-in-time recovery. For example, application IO's A" and C' may be streamed to deduplicated storage as they are made to the source storage system. A user may then decide they wish recover data from the point-in-time immediately after application IO A" was streamed. When the user's request arrives, the most recent snapshot may be initial backup snapshot 814, which does not contain A" or C'. To respond to the user's request, deduplicated storage 804 may synthesize interim snapshot 816. This snapshot may include unchanged data from initial backup snapshot 814, as shown by the solid black arrows, and application IO A" synthesized from data journal file 808, as shown by the dashed arrow. Note that interim snapshot 816 does not include C'. This is because the user requested data recovery at a point-in-time before C' may made.

In an embodiment, the data from interim snapshot 816 may be transmitted back to the source storage system and recovered. Additionally or alternatively, it may be exposed to a host as LUN, as discussed in reference to FIG. 12 and FIG. 13. Interim snapshot 816 may be deleted after recovery, or may be retained. In an embodiment, if interim snapshot 816 is created at a point-in-time sufficiently close to a scheduled synthesis time, the scheduled synthesis may be cancelled and interim snapshot 816 may be treated as second backup snapshot 616.

Turning now to FIG. 9, a flow chart depicting a process for point-in-time recovery is discussed. At block 900, a request to recover some data is received. This request could be, for example, received at data protection appliance 800 and/or deduplicated data storage 804. In an embodiment, the request may specify a file representing a LUN to recover, or it may be a request to recover an entire system. Additionally or alternatively, the request may specify a point-in-time for the recovery. The point-in-time may be a date, event, or any other mechanism to identify a specific time. In some embodiments, the point-in-time may be between snapshots.

At 902, a snapshot nearest the point-in-time may be identified. The snapshot could be, for example, initial backup snapshot 814.

At block 906, a recovery snapshot may be synthesized. This recovery snapshot could be, for example, substantially similar to interim snapshot 816. If the recovery snapshot is synthesized using a snapshot from an earlier point-in-time, IO's stored in a journal file may be applied to synthesize the recovery snapshot.

Finally, at block 908 the recovery snapshot may be provided in response to the request. For example, the recovery snapshot may be exposed as a LUN and mounted on a host computer, or exposed as a network file system share. Additionally or alternatively, the recovery snapshot may be transmitted back to the source storage system. In an embodiment, only a portion of the snapshot, such as a specific file, may be provided.

Combining backup snapshots, journals, and continuous data replication may provide point-in-time recovery capabilities. As more data is written to and/or modified on a source storage system, however, the number of journals and snapshots may increase. In some embodiments, data protection windows may be used to manage this data growth.

Maintaining Backup Granularity on Deduplicated Storage

As the number of snapshots and journals on the deduplicated storage grows, more space may be required. Deleting snapshots and journals may result in important information being lost, and adding to space to the deduplicated storage may be expensive. To address these concerns, backup windows and policies may be defined. Backup windows may be defined intervals designating which snapshot and journals should be stored, and for how long.

Figure 10:
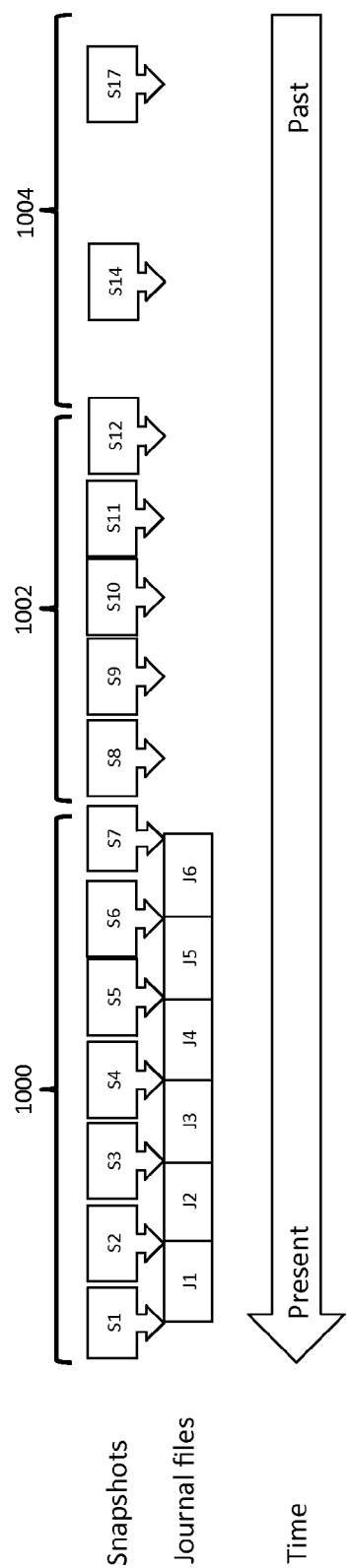
FIG. 10 depicts data protection windows providing backup granularity, consistent with an embodiment of the present disclosure.
Figure 11:
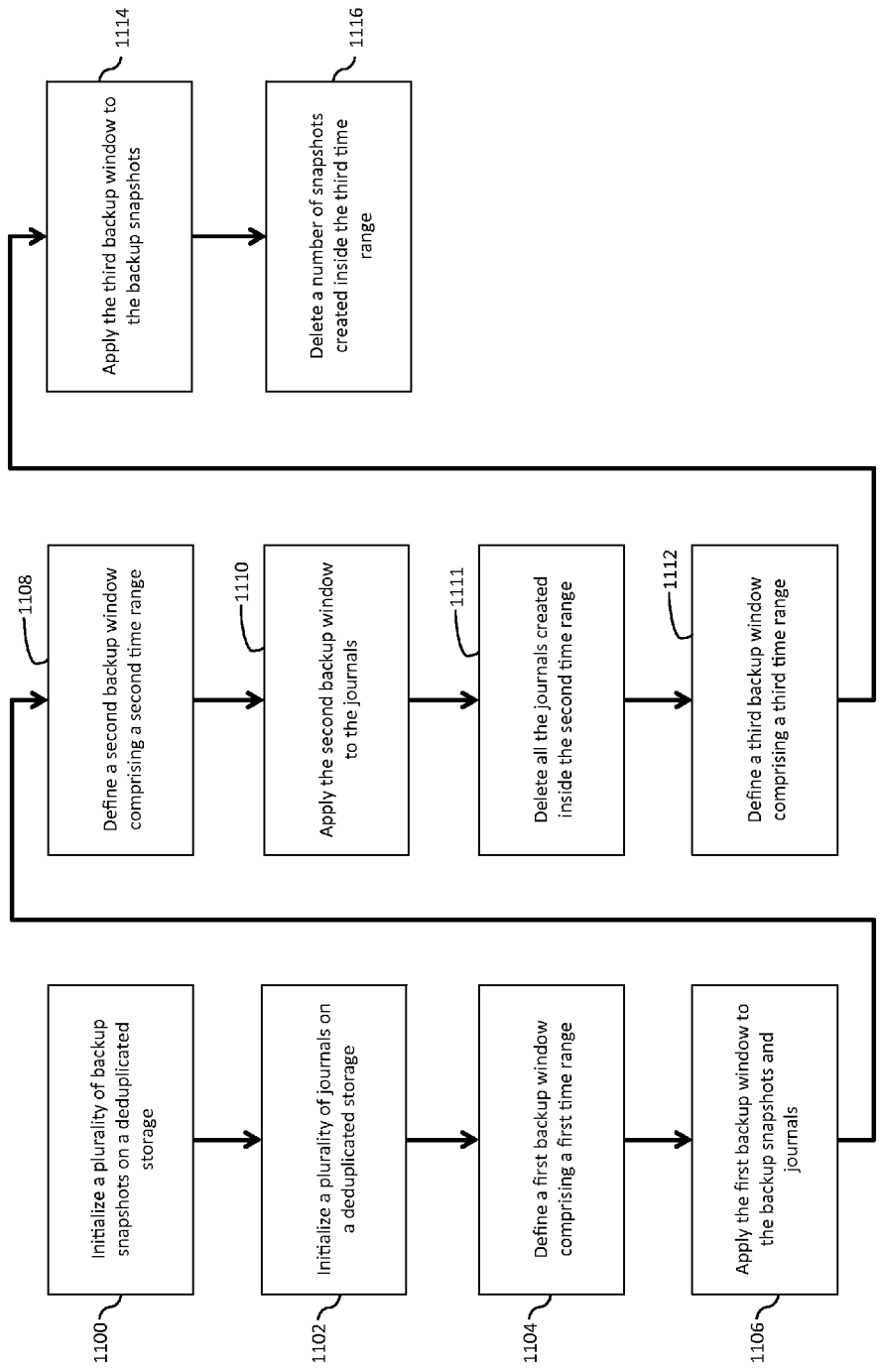
FIG. 11 depicts a flowchart for applying data protection windows, consistent with an embodiment of the present disclosure.

FIG. 10 and FIG. 11 depict a system and process for defining backup granularity using data protection windows. FIG. 10 shows seventeen snapshot files, labeled S1 through S17, stored on a deduplicated storage device. These snapshots may be created and maintained in a manner substantially similar to that discussed above. The deduplicated storage device may also include six journal files, labeled J1 through J6, which may be used to synthesize new snapshots or perform point-in-time recovery.

FIG. 10 also includes three data protection windows: short-term protection window 1000, mid-term protection window 1002, and long term protection window 1004. Each of these protection windows may have an associated policy specifying actions to take on any snapshot and/or journal file within the protection window. For example, one policy may be "delete all journals within this protection window." While the embodiments discussed herein address deletion and/or retention policies, any other policy which may be applied to the journals and/or snapshots is consistent with this disclosure.

Short-term protection window 1000 may be defined to protect both snapshots and journal files allowing for point-in-time recovery. This window may be particularly beneficial for snapshots that were created recently and/or were created on demand by a user. On demand creation may signify that the snapshot is more important than a scheduled snapshot because a user must go out of their way to create it. Further, it may be more likely that a user needs to recover data which was modified or created recently.

Mid-term protection window 1002 may include only snapshot files. As time progresses and journal files move from short-term protection window 1000 into mid-term protection window 1002, they may be deleted. While deleting journal files may prevent most point-in-time recovery, the snapshots may be maintained in mid-term protection window. As a result, some level of point-in-time recovery is preserved. Specifically, any data contained in one of the maintained snapshots may be recovered. Mid-term protection window therefore balances storage needs with recovery needs.

As snapshots move from mid-term protection 1002 window into long-term protection window 1004, certain snapshots may be deleted. Point-in-time recovery may be less important for long-term backups because of their age. The deleted snapshots may be chosen based on a policy, such as size or a user assigned priority. Additionally or alternatively, they may be arbitrarily chosen (for example, only retaining every fifth snapshot).

In an embodiment, data protection windows may be defined and maintained using a data protection appliance, a deduplicated storage device, and/or an external system. For example, if the data protection window is defined using a deduplicated storage device, that device may delete the journals and/or snapshots as the move from one data protection window into another. In some embodiments, the data protection windows may change dynamically based on available space on the deduplicated storage device. For example, if there is a large amount of available space the short-term protection window may be very large, and/or the mid-term and long-term protection windows may not exist. Similarly, if there is not much available space the long-term protection window may be very long.

Turning now to FIG. 11, a method for defining and applying data protection windows is discussed. At 1100, a plurality of backup snapshots may be initialized on a deduplicated storage. These snapshots may be initialized or created using any of the systems or methods discussed herein.

At 1102, a plurality of journals may be initialized on the deduplicated storage device. These journals may be created from application IO's received from source side storage, and may provide point-in-time recovery. In an embodiment, any of the processes discussed herein for creating and/or maintaining journals may be used.

At 1104, a first backup window comprising a first time range may be defined. The time range may specify the amount of time snapshots and/or journals remain inside the backup window. In an embodiment, the time range is dynamically based on the available storage on a deduplicated storage device.

At block 1106, the first backup window may be applied to the backup snapshots and journals. In an embodiment, the first backup window may be defined to maintain all of the snapshots and journals it covers. This may permit point-in-time recovery of data from those files. In an embodiment, the first backup window is substantially similar to the short-term backup window discussed above.

At block 1108, second backup window comprising a second time range may be defined. This second backup window may comprise a second time range similar to the first window's time range. In an embodiment, the second backup window only applies to journals, and may be substantially similar to mid-term backup widow 1002.

At 1110, the second backup window may be applied to the journals. This may occur as the journals move from the first backup window into the second backup window. For example, as time progresses the journal files may move outside the time range defined in the first protection window. This may be, for example, because the time range is shorter than the journals age. The journal may move into the time range specified in the second backup window, and that backup window may be applied.

At block 1111, as journals move into the second time range the may be deleted. In an embodiment, this may mean deleting every journal inside the second time range.

Additionally or alternatively, only select journals may be deleted. For example, the data protection window may have an associated policy specifying that only every second journal should be deleted.

At 1112, a third backup window comprising a third time range may be defined. This third backup window may be substantially similar to long-term window discussed above. In an embodiment, the third time range may be a catch-all, meaning it applies to any journal and/or backup snapshot not covered by the first backup window or the second backup window.

At 1114, the third backup window may be applied to any remaining snapshots and/or journals. In an embodiment, the journals have all been deleted and the third backup window is only applied to snapshot files.

Finally, at block 1116, a number of snap shots inside the third time range may be deleted. The number of snapshots to delete may be based on a policy, such as only retain every tenth snapshot, in some embodiments only a daily snapshot may be kept, or any other policy may be applied (for instance keep ten daily snapshots and then ten weekly snapshots and then ten monthly snapshots, etc).

The data protection windows discussed herein may provide varying degree of backup granularity. More recent and/or important information may include both snapshots and journal files, which longer term backups may only comprise periodic backup snapshots.

Providing Snapshot Access and Retrieval

Data backups are only useful if they can be accessed and/or retrieved when needed. Accessing backup snapshots may allow a user or system to retrieve data needed for recovery. For a system-wide recovery, the entire backup snapshot may be retrieved. In some embodiments, however, it may be beneficial to allow a user to access the snapshot directly to retrieve discrete pieces of data.

Figure 12:
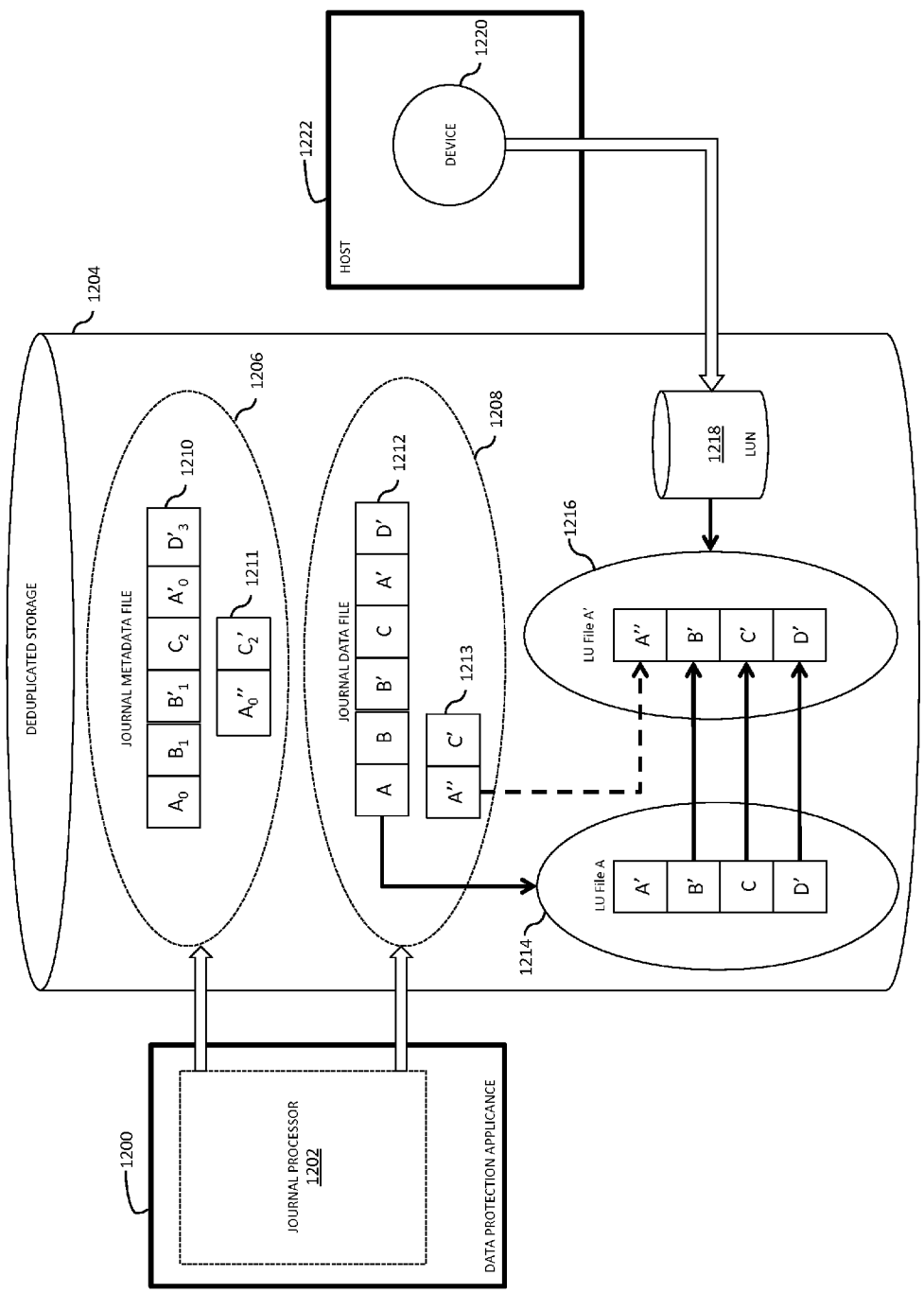
FIG. 12 depicts a system for mounting a recovery snapshot, consistent with an embodiment of the present disclosure.
Figure 13:
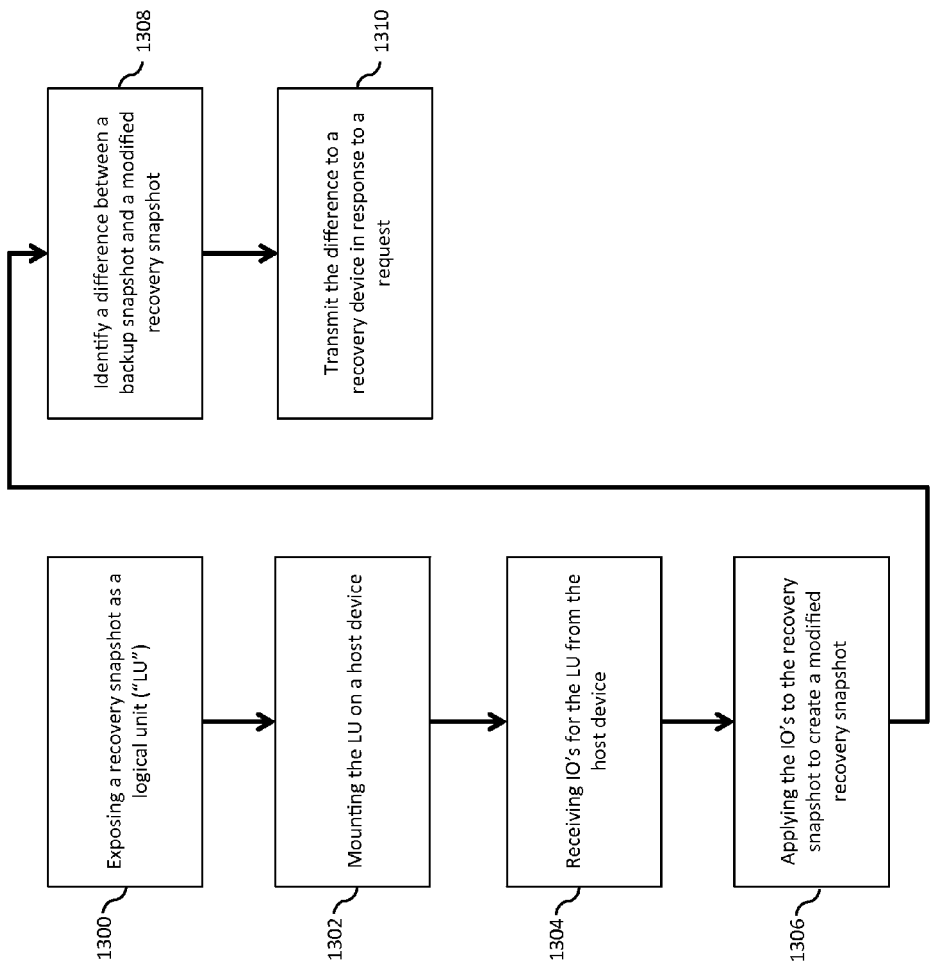
FIG. 13 depicts a flowchart for mounting a recovery snapshot, consistent with an embodiment of the present disclosure.

FIGS. 12 and 13 depict a system and process for providing access to data snapshots. The system of FIG. 12 may include data protection appliance 1200 comprising journal processor 1202, deduplicated storage 1204, and host 1222. In an embodiment, deduplicated storage may comprise metadata journal 1206, data journal 1208, backup snapshot 1214, and recovery snapshot 1216. Recovery snapshot 1216 may be a synthesized snapshot for point-in-time recovery, as discussed in reference to FIG. 8. Metadata journal 1206 may include metadata journal entries 1210 and 1211, and data journal 1208 may include data journal entries 1212 and 1213. In an embodiment, these elements may be substantially similar to those discussed in reference to the figures above.

In some embodiments, a user may need to recover data from recovery snapshot 1216. Transmitting the entire snapshot over a network, however, may be inefficient given the snapshot's size. For example, if recovery snapshot is several gigabytes, and a user wishes to recover a file on the snapshot that is only a few megabytes, transferring the entire recovery snapshot 1216 may consume an unnecessary amount of network bandwidth.

Rather than transmitting recovery snapshot 1216 over a network, deduplicated storage 1204 may create block LUN 1218 on top of the snapshot. LUN 1218 may be exposed and mounted on host 1222 as device 1220. A user may access LUN 1218 through device 1220, and could thereby browse the snapshot for the data they wish to recover. Once the data is located, it may be transmitted to the source storage system directly, through data protection appliance 1200, or through host 1222.

In some embodiments, the source storage system may be down for a prolonged period of time, but a user may still need to access their data. In such an embodiment, the user may mount LUN 1218 as device 1220. Rather than merely recovering data, however, the user may make writes to the recovery snapshot 1216 through LUN 1218. The writes may be tracked, for example using metadata journal 1206 and data journal 1208. Once the source storage system is accessible again, a difference between the latest point in time of the volume at the storage array and the current data at recovery snapshot 1216 may be taken. The results of the difference may indicate which data has changed, and those changes may be communicated back to the source storage system. This may allow a user to continue to access and make changes to their data, even while the source storage system is down.

In an embodiment block LUN 1218 may not be created and mounted on host 1222. Instead, the recovery snapshot may be exposed as a network file system ("NFS") share. Host 1222 may accessed the NFS share, retrieve data, and/or perform write operations.

In some embodiments, recovery snapshot 1216 may comprise a virtual machine disk ("VMDK") file. The VMDK file may be, for example, accessed directly by an NFS mount and the virtual machine may boot using the VMDK file. Host 1222 may interact with the VMDK, and may make changes in the process. The VMDK may be transferred to the source side storage when it is available. In some embodiments, the transfer may occur while the VMDK is running.

Turning now to FIG. 13, a method for exposing a recovery snapshot as a logical unit is discussed. At 1300, a recovery snapshot may be exposed as a LUN. This exposure could occur, for example, by creating a block LUN on top of the snapshot. In some embodiments, the snapshot resides on a deduplicated storage, and the block LUN is created on that storage.

At 1302, the LUN may be mounted on a host device. Once mounted, the host device may access and interact with the LUN as if it were a local drive. For example, the host device may make read and/or write requests to the LUN.

At 1304, the deduplicated storage may receive IO's for the LUN from the host device. These IO's could be, for example, read and/or write requests.

At 1306, the IO's may be applied to the recovery snapshot to create a modified recovery snapshot. For example, the IO's could modify recovery snapshot 1216 to change data E to E'.

At block 1308, a difference between the modified recovery snapshot and a backup snapshot may be identified. This difference could be identified, for example, using API's native to the deduplicated storage device.

Finally, at block 1310, the difference may be transmitted to a recovery device. In some embodiments, the recovery device may be a source storage system. Additionally or alternatively, the difference may be transmitted in response to a request. For example, a user may access the system and request the difference between the modified recovery snapshot and a backup snapshot.

Figure 13A:
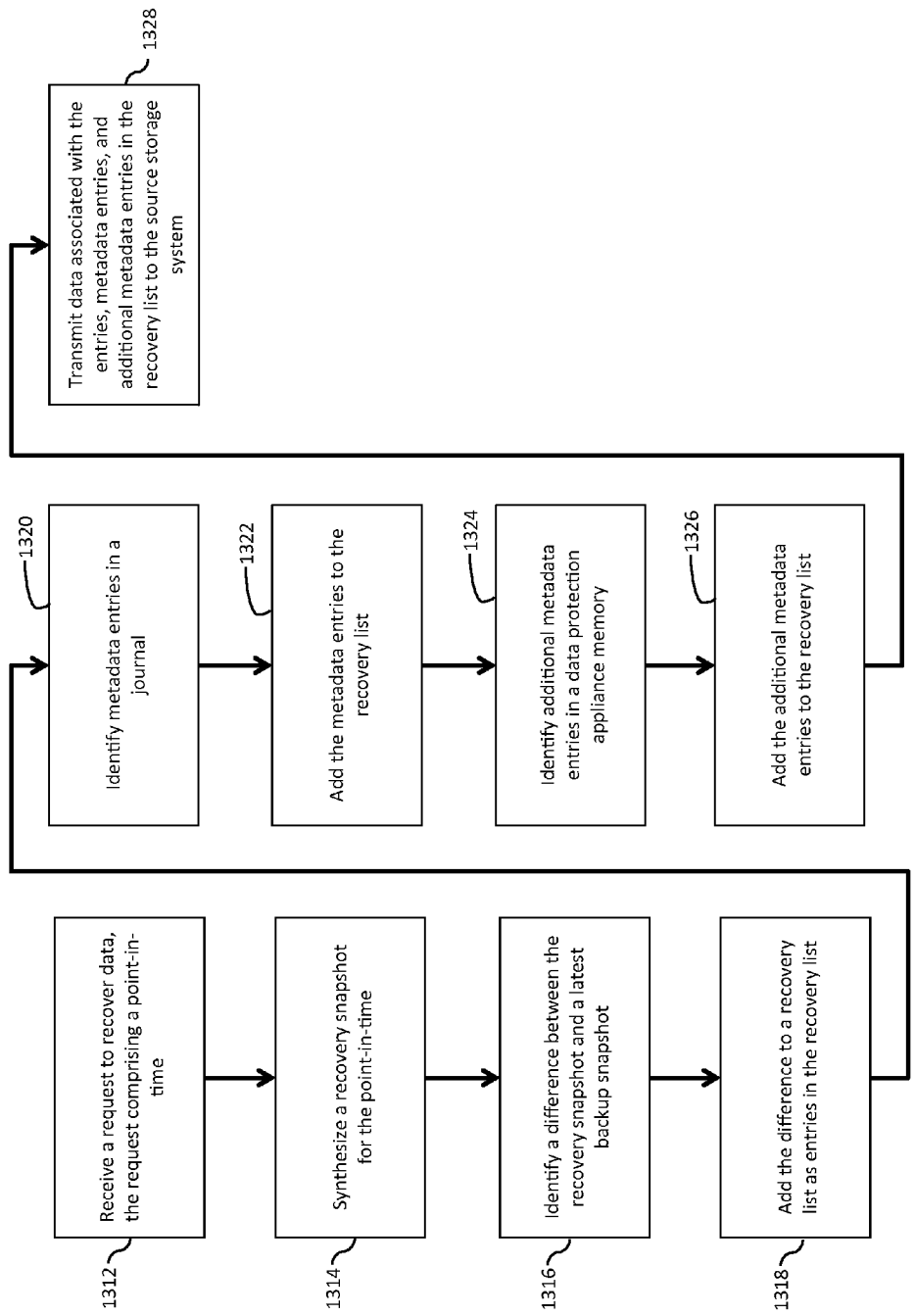
FIG. 13A depicts a flowchart for recovering data for a corrupt source data system consistent with an embodiment of the present disclosure.

Turning now to FIG. 13A, a method for recovering a logically corrupted source storage system is discussed. In an embodiment, a user may wish to recover the data on the corrupted system. The user may identify a point-in-time where the system is believed to not be corrupt, and synthesize a snapshot comprising data between that point-in-time and the latest point on the storage system. This snapshot may be applied to the system to recover the corrupt data.

At 1312, a request may be received from a user to recover data. The request may comprise a point-in-time identifying a time when the user believes the data was not corrupt. In an embodiment, the data between the point-in-time and the present time must be recovered because it is corrupt on the source storage system. Since the application IO's are made to the deduplicated storage in real time, however, the data on that location may be correct.

At 1314, a recovery snapshot may be synthesized for the point-in-time. This recovery snapshot could be, for example, synthesized in a manner substantially similar to the discussed above.

At 1316, a difference may be identified between the recovery snapshot and the latest backup snapshot. The latest backup snapshot may be a snapshot for a point-in-time later than the recover snapshot. For example, if the recovery snapshot comprises A, B, C, D, and E, and the latest backup snapshot comprises A', B, C', D, and E, the difference may be A' and C'. In an embodiment, the difference is identified on a deduplicated storage device and may use native APIs.

At 1318, the difference may be added to a recovery list as entries in that recovery list. In an embodiment, the entries may be metadata associated with the difference. For example, the recovery list may comprise metadata entries for A' and C'.

At block 1320, metadata entries in the latest journal file may be identified. The metadata entries may comprise metadata that is not included in the latest synthesized backup. For example, they may comprise application IO's that arrived after the latest backup snapshot was synthesized. This identification process could occur, for example, at a journal processor.

At block 1322, the metadata journal entries may be added to the recovery list. For example, if the entries comprise A" and D', the new recovery list may comprise A", C', and D'.

At block 1324, additional metadata entries may be identified in a data protection appliance memory. In an embodiment, these entries may be for application IO's which have arrived at the data protection appliance, but have not yet been transmitted and/or written to the journal file.

At 1326, the additional metadata entries may be added to the recovery list. For example, if the data protection appliance's memory includes B', the recovery list may comprise A", B', and D'.

Finally, at 1318 data associated with the metadata entries may be identified and transmitted back to the source storage system for recovery. If the metadata comprises pointers, for example, the data pointed to by the pointers may be transmitted back to the source storage system.

Synthesizing a Backup Snapshot from Multiple Data Protection Appliances

For large, heavily used source storage systems, the volume of application and/or initialization IO's may be too great for a single data protection appliance to maintain. If a data protection appliance is overburdened, journal files may not be up-to-date and valuable data may be lost if the source storage system fails. Using multiple data protection appliances may alleviate this risk.

Figure 14:
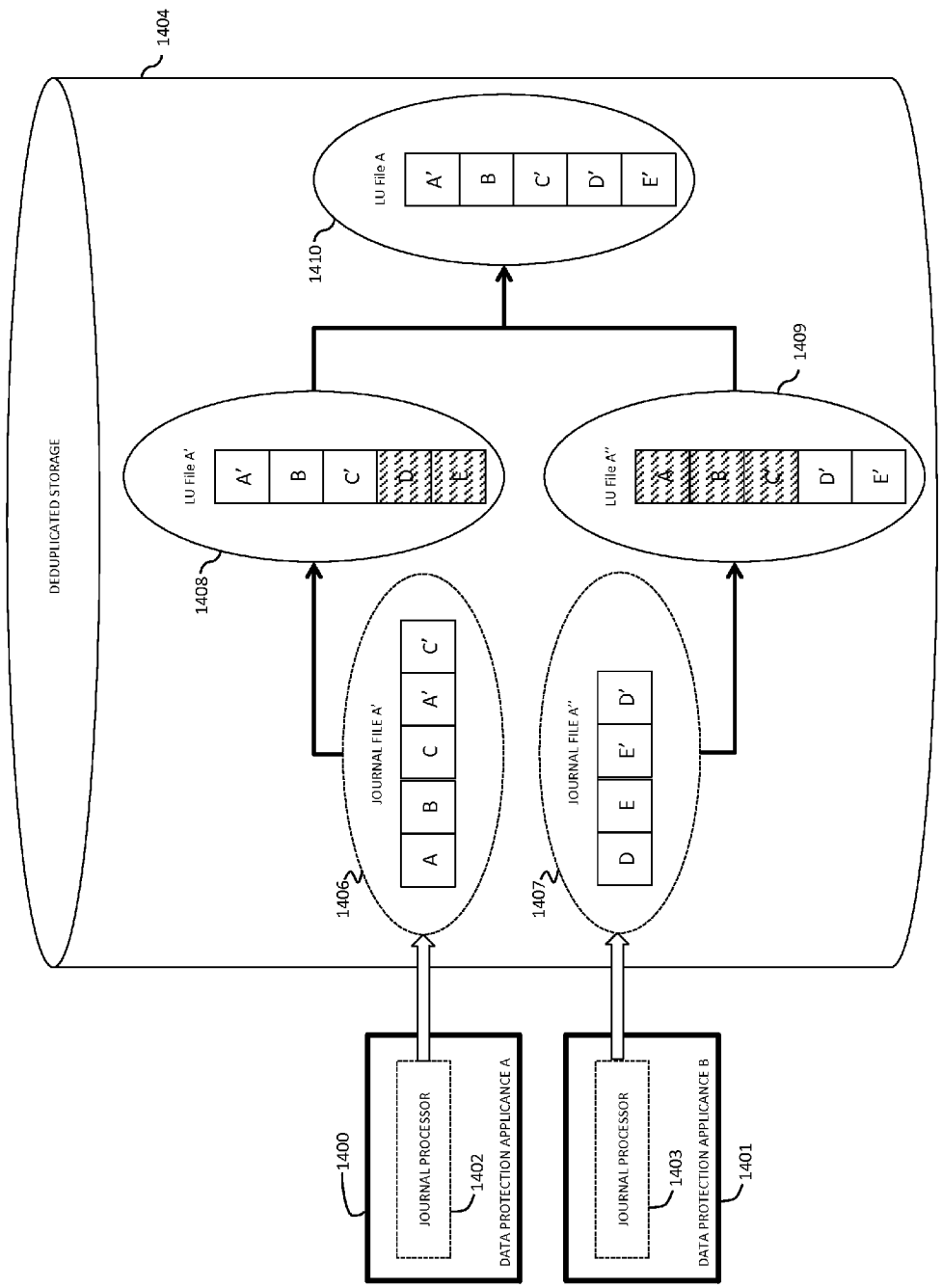
FIG. 14 depicts a system for receiving application IO's from multiple data protection appliances, consistent with an embodiment of the present disclosure.
Figure 15:
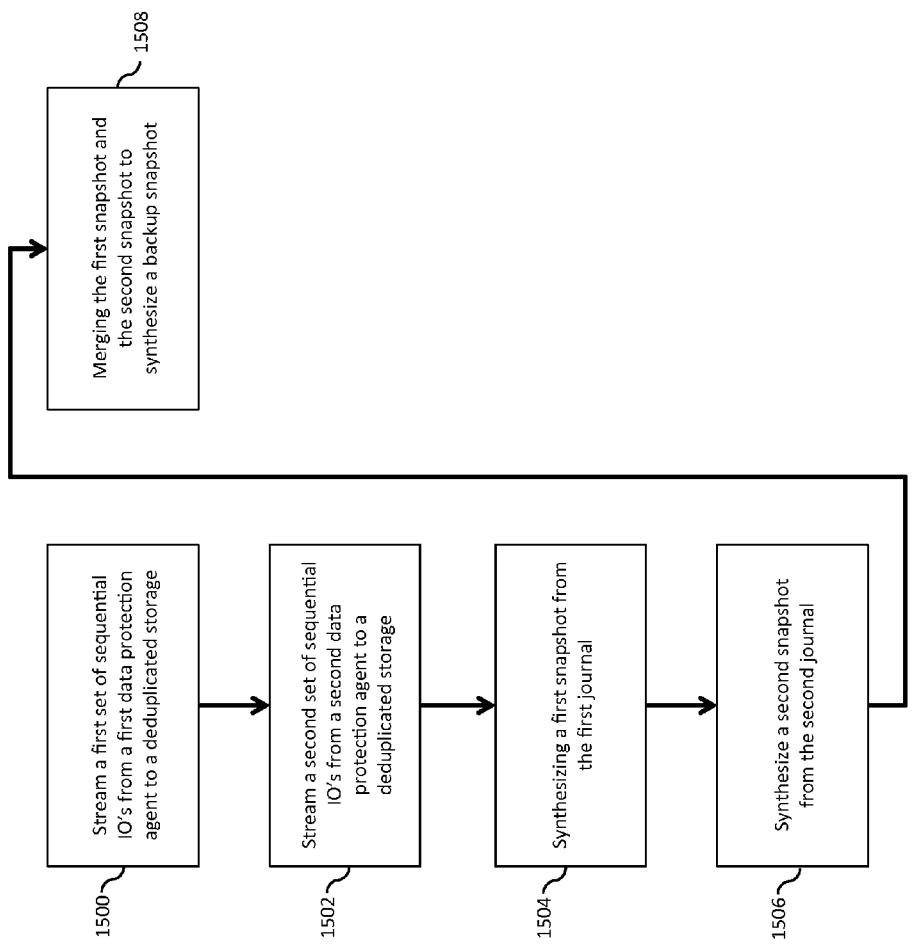
FIG. 15 depicts a flowchart for receiving application IO's from multiple data sources, consistent with an embodiment of the present disclosure.

FIG. 14 and FIG. 15 show a system and method for creating backup snapshots using multiple data protection appliances. The system depicted in FIG. 15 includes data protection appliance 1400 and data protection appliance 1401. In an embodiment, each of these data protection appliances is responsible for protecting specific portions of a LUN in a source storage system. For example, data protection appliance 1400 may be responsible for protecting a first chunk of a LUN in a common storage array, and data protection appliance 1401 may be responsible for protecting a second chunk in a LUN of the common storage array. If an application IO is made to the first chunk, it is received by data protection appliance 1400 and written to journal file 1406 using journal processor 1402. Similarly, if an application IO is made to the second chunk it may be received by data protection appliance 1401 and written to journal file 1407 using journal processor 1403. In this manner, all of the application IO's may be written to a journal using two data protection appliances.

While there are only two data protection appliances shown in FIG. 14, it should be appreciated that any number of data protection appliances is consistent with this disclosure. For example, the source storage system may be divided into five sections or chunks which are protected by five separate and distinct data protection appliances.

In some embodiments, there is no overlap between the chunks protected by different data protection appliances. For example, data protection appliance 1400 will not protect a chunk that is also protected by data protection appliance 1401. Alternatively, there may be protection overlap for redundancy.

In some embodiments the chunks of the LUN may not consist of continuous parts. For instance, a first chunk may contain 1 MB portions which start at an offset which is 2N MB, while chunk 2 contains 1 MB portions starting an offset of 2(N+1) MB.

Journals 1406 and 1407 may be separate journal files accessible only by their associated data protection appliance. Alternatively, they may be the same journal file accessible by both data protection appliances. Additionally, journals 1406 and 1407 may include both a metadata journal file and a data journal file, as discussed above. The metadata journal and data journals are not shown in FIG. 14 for ease of illustration, but they may still be part of journal file 1406 and 1407.

Journals files 1406 and 1407 may be used by deduplicated storage 1404 to synthesize snapshots for each of the regions their respective data protection appliances protect. For example, suppose source storage system comprises data A, B, C, D, and E. Data protection appliance 1400 may be responsible for protecting A, B, and C, and data protection appliance 1401 may be responsible for protecting D and E. As a result, journal 1406 contains data and metadata for A, B, and C, but not D or E. Similarly, journal 1407 contains data and metadata for D and E, but not A, B, or C.

Since each journal only contains data associated with specific regions of the source storage system, neither journal alone can synthesize a complete backup snapshot. First snapshot 1408 may be synthesized using the data and metadata from journal file 1406.

Snapshot 1408 may include A', B, and C', but does not contain data for D or E as shown by the hash marks in the Figure. Similarly, second snapshot 1409 contains data D' and E', but no data for A, B, or C. Neither of these snapshots therefore represents a complete backup snapshot of the source storage system.

Backup snapshot 1410 may be synthesized by merging first snapshot 1408 and second snapshot 1409. Backup snapshot 1410 may comprise a complete backup of the source storage system. In an embodiment, this synthesis may be accomplished by synthesis data from each snapshot 1408 and 1409 into snapshot 1410. Alternatively, first snapshot 1408 may be merged into second snapshot 1409 to created backup snapshot 1410. Once backup snapshot 1410 is synthesized, snapshots 1408 and 1409 may be deleted to conserve space, or retained for redundancy.

In some embodiments, first snapshot 1408 and second snapshot 1409 may never be created. Instead, backup snapshot 1410 may synthesize the necessary data directly from journal files 1406 and 1407.

Turning now to FIG. 15, a flow chart for synthesizing a backup snapshot from data received from multiple data protection appliances is discussed. At 1500, a first set of sequential IO's may be streamed from a data protection appliance to a deduplicated storage device. The IO's could be, for example, sequential IOs. In an embodiment the IO's may be for a specific section, chunk, or region of the source storage system.

At 1502, a second set of sequential IO's may be streamed from a second data protection appliance to the deduplicated storage. In an embodiment, these IO's may be for a separate section of the source storage system than those streamed from the first data protection appliance. While the first set of sequential IO's and the second set of sequential IO's may be for different regions of a source storage system, such as a data array, they may both be made to the same source data system. In other words, the application IO's may be made to a common source, which is divided into chunks protected by separate data protection appliances.

At 1504, a first snapshot may be synthesized from the first journal file. This snapshot could be, for example, snapshot 1408. In an embodiment, the first snapshot only contains data included in the first journal.

At 1506, a second snapshot may be synthesized from the second journal. This snapshot could be substantially similar to snapshot 1409, and may only contain data from the second journal file.

Finally, at 1508 the first snapshot and the second snapshot may be merged to create a backup snapshot. This could be, for example, backup snapshot 1410.

General Purpose Computer System

Figure 16:
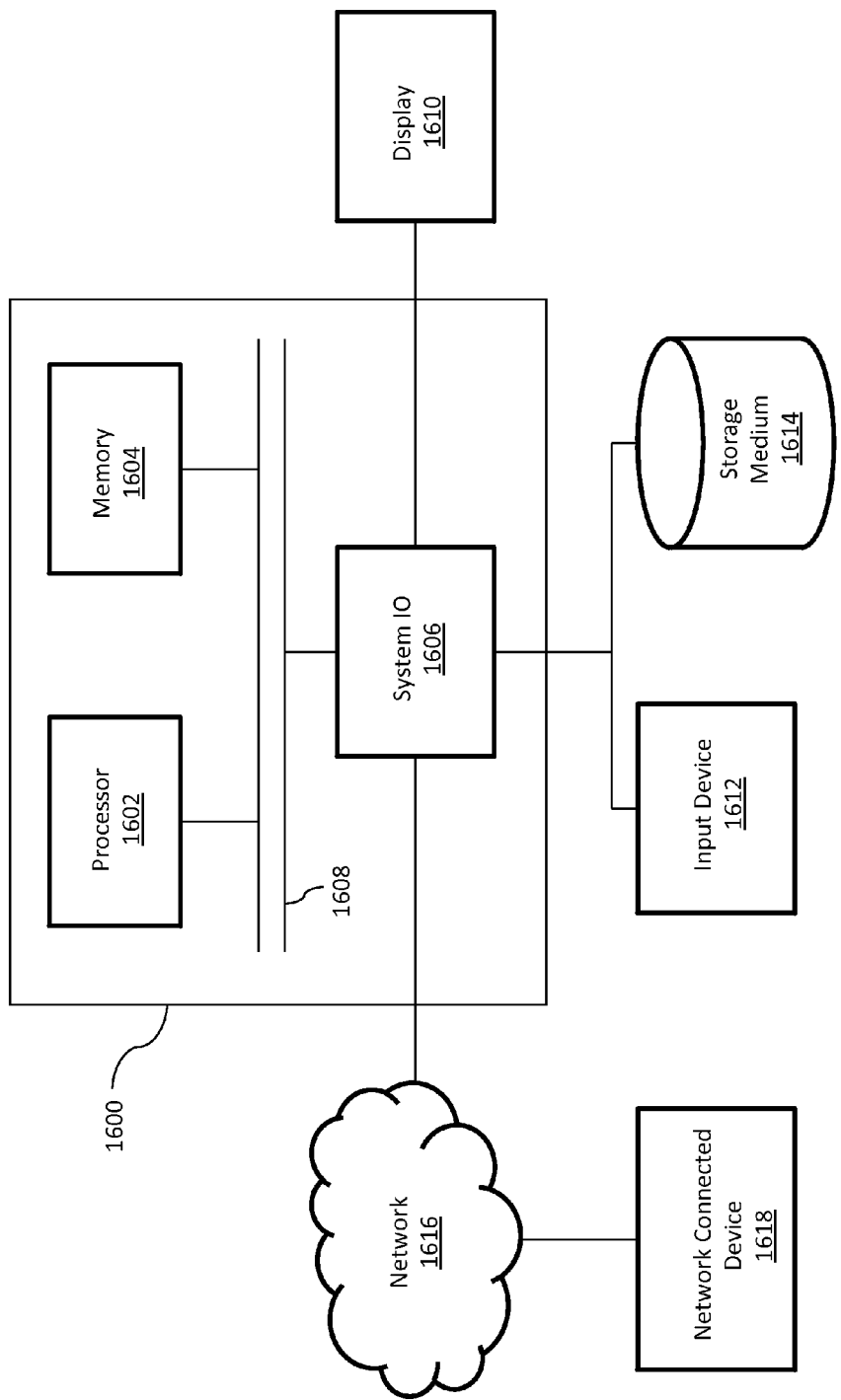
FIG. 16 depicts a general purpose computer system, consistent with an embodiment of the present disclosure.

FIG. 16 depicts a computer system which may be used to implement different embodiments discussed herein. General purpose computer 1600 may include processor 1602, memory 1604, and system IO controller 1606, all of which may be in communication over system bus 1608. In an embodiment, processor 1602 may be a central processing unit ("CPU") or accelerated processing unit ("APU"). Some embodiments may comprise multiple processors, or a processor with multiple cores. Processor 1602 and memory 1604 may together execute a computer process, such as the processes described herein.

System IO controller 1606 may be in communication with display 1610, input device 1612, non-transitory computer readable storage medium 1614, and/or network 1616. Display 1610 may be any computer display, such as a monitor, a smart phone screen, or wearable electronics and/or it may be an input device such as a touch screen. Input device 1612 may be a keyboard, mouse, track-pad, camera, microphone, or the like, and storage medium 1614 may comprise a hard drive, flash drive, solid state drive, magnetic tape, magnetic disk, optical disk, or any other computer readable and/or writable medium. Storage device 1614 may also reside inside general purpose computer 1600, rather than outside as shown in FIG. 1.

Network 1616 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 1616 may be either wired or wireless or any combination thereof, and may provide input to or receive output from IO controller 1606. In an embodiment, network 1616 may be in communication with one or more network connected devices 1618, such as another general purpose computer, smart phone, PDA, storage device, tablet computer, or any other device capable of connecting to a network.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for recovering a source storage system, the method comprising:
   intercepting write transactions issued by a host computer to the source storage system before the write transactions are received at the source storage system;
   streaming the intercepted write transactions to a backup storage system;
   upon receipt of the stream of intercepted write transactions at the backup storage system, recording metadata associated with the write transactions in a metadata journal at the backup storage system, and data associated with the write transactions in a data journal at the backup storage system;
   after the recording metadata and data, allowing the write transactions issued by the host computer to be received at the source storage system;
   periodically synthesizing backup snapshots of the source storage system using the metadata journal and data journal at the backup storage system;
   receiving a request to recover data for the source storage system, the request comprising a point-in-time that is before a logical corruption of the source storage system;
   synthesizing a recovery snapshot for the point-in-time using the metadata journal and data journal at the backup storage system;
   identifying a difference between the recovery snapshot and a latest synthesized backup snapshot, the latest synthesized backup snapshot having been created for a point-in-time that is after the point-in-time of the recovery snapshot;
   adding the difference to a recovery list as entries in the recovery list;
   identifying metadata entries in the metadata journal at the backup storage system, wherein the metadata entries are not in the latest synthesized backup snapshot;
   adding the metadata entries to the recovery list; and
   transmitting data associated with entries in the recovery list to the source storage system.

2. The method of claim 1, further comprising:
   identifying additional metadata entries in a data protection appliance memory at the backup storage system, wherein the additional metadata entries have not been written to the metadata journal; and
   adding the additional metadata entries to the recovery list.

3. A computer program product for recovering a source storage system, the computer program product comprising a non-transitory computer readable medium encoded with computer executable program, the code enabling:
   intercepting write transactions issued by a host computer to the source storage system before the write transactions are received at the source storage system;
   streaming the intercepted write transactions to a backup storage system;
   upon receipt of the stream of intercepted write transactions at the backup storage system, recording metadata associated with the write transactions in a metadata journal at the backup storage system, and data associated with the write transactions in a data journal at the backup storage system;

after the recording metadata and data, allowing the write transactions issued by the host computer to be received at the source storage system;
periodically synthesizing backup snapshots of the source storage system using the metadata journal and data journal at the backup storage system;
receiving a request to recover data for the source storage system, the request comprising a point-in-time that is before a logical corruption of the source storage system;
synthesizing a recovery snapshot for the point-in-time using the metadata journal and data journal at the backup storage system;
identifying a difference between the recovery snapshot and a latest synthesized backup snapshot, the latest synthesized backup snapshot having been created for a point-in-time that is after the point-in-time of the recovery snapshot;
adding the difference to a recovery list as entries in the recovery list;
identifying metadata entries in the metadata journal at the backup storage system, wherein the metadata entries are not in the latest synthesized backup snapshot;
adding the metadata entries to the recovery list; and
transmitting data associated with entries in the recovery list to the source storage system.

4. The computer program product of claim 3, further comprising:
identifying additional metadata entries in a data protection appliance memory at the backup storage system, wherein the additional metadata entries have not been written to the metadata journal; and
adding the additional metadata entries to the recovery list.

5. A system for recovering a source storage system, the system comprising a computer processor configured to execute instructions comprising:
intercepting write transactions issued by a host computer to the source storage system before the write transactions are received at the source storage system;
streaming the intercepted write transactions to a backup storage system;
upon receipt of the stream of intercepted write transactions at the backup storage system, recording metadata associated with the write transactions in a metadata journal at the backup storage system, and data associated with the write transactions in a data journal at the backup storage system;
after the recording metadata and data, allowing the write transactions issued by the host computer to be received at the source storage system;
periodically synthesizing backup snapshots of the source storage system using the metadata journal and data journal at the backup storage system;
receiving a request to recover data for the source storage system, the request comprising a point-in-time that is before a logical corruption of the source storage system;
synthesizing a recovery snapshot for the point-in-time using the metadata journal and data journal at the backup storage system;
identifying a difference between the recovery snapshot and a latest synthesized backup snapshot, the latest synthesized backup snapshot having been created for a point-in-time that is after the point-in-time of the recovery snapshot;
adding the difference to a recovery list as entries in the recovery list;
identifying metadata entries in the metadata journal at the backup storage system, wherein the metadata entries are not in the latest synthesized backup snapshot;
adding the metadata entries to the recovery list; and
transmitting data associated with entries in the recovery list to the source storage system.

6. The system of claim 5, further comprising:
identifying additional metadata entries in a data protection appliance memory at the backup storage system, wherein the additional metadata entries have not been written to the metadata journal; and
adding the additional metadata entries to the recovery list.

* * * * *